(12) United States Patent
Karpenko et al.

(10) Patent No.: US 12,084,387 B2
(45) Date of Patent: *Sep. 10, 2024

(54) PROCESSES AND MATERIALS FOR CASTING AND SINTERING GREEN GARNET THIN FILMS

(71) Applicant: QuantumScape Battery, Inc., San Jose, CA (US)

(72) Inventors: Oleh Karpenko, San Jose, CA (US); Gengfu Xu, San Jose, CA (US); Niall Donnelly, San Jose, CA (US); Sriram Iyer, San Jose, CA (US); Tim Holme, San Jose, CA (US)

(73) Assignee: QuantumScape Battery, Inc., San Jose, CA (US)

( * ) Notice: Subject to any disclaimer, the term of this patent is extended or adjusted under 35 U.S.C. 154(b) by 1131 days.

This patent is subject to a terminal disclaimer.

(21) Appl. No.: 16/734,196

(22) Filed: Jan. 3, 2020

(65) Prior Publication Data

US 2020/0216361 A1    Jul. 9, 2020

Related U.S. Application Data

(63) Continuation of application No. 15/216,636, filed on Jul. 21, 2016, now abandoned.

(Continued)

(51) Int. Cl.
C04B 35/50 (2006.01)
B32B 18/00 (2006.01)
(Continued)

(52) U.S. Cl.
CPC .............. *C04B 35/50* (2013.01); *B32B 18/00* (2013.01); *B32B 37/16* (2013.01); *C04B 35/486* (2013.01); *C04B 35/62218* (2013.01); *C04B 35/6261* (2013.01); *C04B 35/6264* (2013.01); *C04B 35/634* (2013.01); *C04B 35/6342* (2013.01);
(Continued)

(58) Field of Classification Search
CPC ...... C04B 35/50; C04B 35/6342; C04B 35/64
See application file for complete search history.

(56) References Cited

U.S. PATENT DOCUMENTS

| 4,259,061 A | 3/1981 | Dubetsky |
| 4,340,436 A | 7/1982 | Dubetsky et al. |

(Continued)

FOREIGN PATENT DOCUMENTS

| CN | 1746757 A | 3/2006 |
| CN | 101518164 A | 8/2009 |

(Continued)

OTHER PUBLICATIONS

Rahaman (Ceramic Processing, Kirk-Othmer Encyclopedia of Chemical Technololy, 2014) (Year: 2014).*

(Continued)

*Primary Examiner* — Liam J Heincer
(74) *Attorney, Agent, or Firm* — Squire Patton Boggs (US) LLP

(57) ABSTRACT

Set forth herein are processes and materials for making ceramic thin films by casting ceramic source powders and precursor reactants, binders, and functional additives into unsintered thin films and subsequently sintering the thin films under controlled atmospheres and on specific substrates.

31 Claims, 4 Drawing Sheets

Related U.S. Application Data

(60) Provisional application No. 62/195,172, filed on Jul. 21, 2015.

(51) Int. Cl.
| | |
|---|---|
| *B32B 37/16* | (2006.01) |
| *C04B 35/486* | (2006.01) |
| *C04B 35/622* | (2006.01) |
| *C04B 35/626* | (2006.01) |
| *C04B 35/634* | (2006.01) |
| *C04B 35/638* | (2006.01) |
| *C04B 35/64* | (2006.01) |
| *H01M 10/052* | (2010.01) |
| *H01M 10/0525* | (2010.01) |
| *H01M 10/0562* | (2010.01) |

(52) U.S. Cl.
CPC ............ *C04B 35/638* (2013.01); *C04B 35/64* (2013.01); *H01M 10/052* (2013.01); *H01M 10/0525* (2013.01); *H01M 10/0562* (2013.01); *C04B 2235/3203* (2013.01); *C04B 2235/3217* (2013.01); *C04B 2235/3227* (2013.01); *C04B 2235/3248* (2013.01); *C04B 2235/5409* (2013.01); *C04B 2235/5436* (2013.01); *C04B 2235/5445* (2013.01); *C04B 2235/5463* (2013.01); *C04B 2235/6025* (2013.01); *C04B 2235/608* (2013.01); *C04B 2235/6584* (2013.01); *C04B 2235/6588* (2013.01); *C04B 2235/66* (2013.01); *C04B 2235/764* (2013.01); *C04B 2237/34* (2013.01); *C04B 2237/343* (2013.01); *C04B 2237/346* (2013.01); *C04B 2237/562* (2013.01); *H01M 2300/0068* (2013.01); *H01M 2300/0071* (2013.01)

(56) References Cited

U.S. PATENT DOCUMENTS

| | | | |
|---|---|---|---|
| 4,492,783 A | 1/1985 | Tanaka et al. | |
| 4,878,838 A | 11/1989 | Verheyden, Jr. | |
| 5,014,763 A | 5/1991 | Frank | |
| 5,130,067 A | 7/1992 | Flaitz et al. | |
| 5,250,243 A | 10/1993 | Allaire et al. | |
| 5,256,242 A | 10/1993 | Imaeda et al. | |
| 5,279,994 A | 1/1994 | Kerkar | |
| 5,296,318 A | 3/1994 | Gozdz et al. | |
| 5,456,000 A | 10/1995 | Gozdz et al. | |
| 5,460,904 A | 10/1995 | Gozdz et al. | |
| 5,620,637 A | 4/1997 | Kaga et al. | |
| 5,874,162 A | 2/1999 | Bastian et al. | |
| 5,915,958 A | 6/1999 | Kurie | |
| 5,922,493 A | 7/1999 | Humphrey, Jr. et al. | |
| 6,277,524 B1 | 8/2001 | Kanno | |
| 6,306,336 B1 | 10/2001 | Hrezo et al. | |
| 6,306,535 B1 | 10/2001 | Tomimatsu et al. | |
| 6,322,923 B1 | 11/2001 | Spotnitz et al. | |
| 6,447,712 B1 * | 9/2002 | Dogan | C04B 33/32 264/607 |
| 6,514,072 B1 | 2/2003 | Bencic | |
| 6,561,799 B2 | 5/2003 | Baudry et al. | |
| 6,656,641 B1 | 12/2003 | Kumar | |
| 6,852,138 B1 | 2/2005 | Topsoe et al. | |
| 6,863,862 B2 | 3/2005 | Rasouli et al. | |
| 6,924,065 B2 | 8/2005 | Noh | |
| 7,108,827 B1 | 9/2006 | Hata et al. | |
| 7,736,810 B2 | 6/2010 | Noh | |
| 7,794,557 B2 * | 9/2010 | Hui | C04B 35/2666 264/650 |
| 7,901,658 B2 | 3/2011 | Weppner et al. | |
| 7,923,149 B2 | 4/2011 | Hwang et al. | |
| 7,947,213 B2 | 5/2011 | Badding et al. | |
| 8,092,941 B2 | 1/2012 | Weppner et al. | |
| 8,235,710 B2 | 8/2012 | Bloemacher et al. | |
| 8,268,488 B2 | 9/2012 | Neudecker | |
| 8,283,843 B2 | 10/2012 | Pan et al. | |
| 8,309,258 B2 | 11/2012 | Kanamura et al. | |
| 8,329,605 B2 | 12/2012 | Bernard-Granger et al. | |
| 8,375,734 B2 | 2/2013 | Hall et al. | |
| 8,425,225 B2 | 4/2013 | Pasquinet et al. | |
| 8,431,287 B2 | 4/2013 | Teramoto | |
| 8,658,317 B2 | 2/2014 | Weppner et al. | |
| 8,697,292 B2 | 4/2014 | Kanno et al. | |
| 8,828,580 B2 | 9/2014 | Visco et al. | |
| 8,865,355 B2 * | 10/2014 | Iriyama | H01M 10/0562 429/304 |
| 8,877,388 B1 | 11/2014 | Ihlefeld et al. | |
| 8,940,446 B1 | 1/2015 | Holme et al. | |
| 9,034,526 B2 | 5/2015 | Teshima et al. | |
| 9,093,717 B2 | 7/2015 | Sakamoto et al. | |
| 9,287,106 B1 | 3/2016 | Miao et al. | |
| 9,362,546 B1 | 6/2016 | Donnelly et al. | |
| 9,790,121 B2 | 10/2017 | Abramov et al. | |
| 9,806,372 B2 | 10/2017 | Holme et al. | |
| 9,966,630 B2 | 5/2018 | Cheng et al. | |
| 9,970,711 B2 | 5/2018 | Iyer et al. | |
| 10,008,742 B2 | 6/2018 | Holme et al. | |
| 10,026,990 B2 | 7/2018 | Badding et al. | |
| 10,103,405 B2 | 10/2018 | Choi et al. | |
| 10,155,667 B2 | 12/2018 | Badding et al. | |
| 10,283,811 B2 | 5/2019 | Badding et al. | |
| 10,290,895 B2 | 5/2019 | Holme et al. | |
| 10,305,141 B2 | 5/2019 | Choi et al. | |
| 10,347,936 B2 | 7/2019 | Choi et al. | |
| 10,347,937 B2 | 7/2019 | Beck et al. | |
| 10,361,455 B2 | 7/2019 | Allenic et al. | |
| 10,396,396 B2 | 8/2019 | Badding et al. | |
| 10,403,931 B2 | 9/2019 | Holme et al. | |
| 10,403,932 B2 | 9/2019 | Choi et al. | |
| 10,422,581 B2 | 9/2019 | Iyer et al. | |
| 10,431,806 B2 | 10/2019 | Donnelly et al. | |
| 10,431,850 B2 | 10/2019 | Choi et al. | |
| 10,439,251 B2 | 10/2019 | Holme et al. | |
| 10,486,332 B2 | 11/2019 | Badding et al. | |
| 10,563,918 B2 | 2/2020 | Iyer et al. | |
| 10,581,115 B2 | 3/2020 | Badding et al. | |
| 10,651,502 B2 | 5/2020 | Holme et al. | |
| 10,746,468 B2 | 8/2020 | Iyer et al. | |
| 10,766,165 B2 | 9/2020 | Badding et al. | |
| 10,804,564 B2 | 10/2020 | Allenic et al. | |
| 10,840,544 B2 | 11/2020 | Holme et al. | |
| 10,862,161 B2 | 12/2020 | Choi et al. | |
| 10,875,212 B2 | 12/2020 | Badding et al. | |
| 10,967,539 B2 | 4/2021 | Badding et al. | |
| 11,014,822 B2 | 5/2021 | Badding et al. | |
| 11,111,155 B1 | 9/2021 | Badding et al. | |
| 11,139,503 B2 | 10/2021 | Karpenko et al. | |
| 11,148,321 B2 | 10/2021 | Badding et al. | |
| 11,158,842 B2 | 10/2021 | Donnelly et al. | |
| 11,158,880 B2 | 10/2021 | Chao et al. | |
| 11,165,096 B2 | 11/2021 | Allenic et al. | |
| 11,171,357 B2 | 11/2021 | Choi et al. | |
| 11,171,358 B2 | 11/2021 | Holme et al. | |
| 2002/0054419 A1 | 5/2002 | Beteille et al. | |
| 2002/0182556 A1 | 12/2002 | Baudry et al. | |
| 2003/0049499 A1 | 3/2003 | Murakawa et al. | |
| 2003/0072870 A1 | 4/2003 | Brandle et al. | |
| 2003/0148179 A1 | 8/2003 | Uyama et al. | |
| 2004/0074338 A1 | 4/2004 | Kuhn et al. | |
| 2004/0191617 A1 | 9/2004 | Visco et al. | |
| 2005/0016839 A1 | 1/2005 | Horne et al. | |
| 2006/0120160 A1 | 6/2006 | Park et al. | |
| 2006/0197245 A1 | 9/2006 | Cheng et al. | |
| 2007/0015061 A1 | 1/2007 | Klaassen | |
| 2007/0117026 A1 * | 5/2007 | Kumar | H01M 50/434 264/618 |
| 2007/0148553 A1 | 6/2007 | Weppner et al. | |
| 2007/0231704 A1 | 10/2007 | Inda | |
| 2008/0145751 A1 | 6/2008 | Ogumi et al. | |
| 2008/0199822 A1 | 8/2008 | Blomacher et al. | |
| 2009/0069740 A1 * | 3/2009 | Visco | A61N 1/0436 604/20 |

(56) References Cited

U.S. PATENT DOCUMENTS

| | | |
|---|---|---|
| 2009/0162755 A1 | 6/2009 | Neudecker |
| 2009/0194222 A1* | 8/2009 | Teramoto ............ H01M 4/0407 |
| | | 156/89.12 |
| 2009/0197172 A1 | 8/2009 | Inda |
| 2009/0226790 A1 | 9/2009 | Kanamura et al. |
| 2009/0298001 A1 | 12/2009 | Klein et al. |
| 2009/0301769 A1 | 12/2009 | Seppa et al. |
| 2009/0311567 A1 | 12/2009 | Visco et al. |
| 2009/0317724 A1 | 12/2009 | Kumar et al. |
| 2010/0047696 A1 | 2/2010 | Yoshida et al. |
| 2010/0062385 A1 | 3/2010 | Pasquinet et al. |
| 2010/0203383 A1 | 8/2010 | Weppner et al. |
| 2011/0045355 A1 | 2/2011 | Ichikawa et al. |
| 2011/0052972 A1 | 3/2011 | Sohn |
| 2011/0053000 A1 | 3/2011 | Kanamura et al. |
| 2011/0053001 A1 | 3/2011 | Babic et al. |
| 2011/0053002 A1 | 3/2011 | Yamamura et al. |
| 2011/0133136 A1 | 6/2011 | Weppner et al. |
| 2011/0198785 A1 | 8/2011 | Kester et al. |
| 2011/0223487 A1 | 9/2011 | Johnson et al. |
| 2011/0244337 A1* | 10/2011 | Ohta ................ C04B 35/4885 |
| | | 429/322 |
| 2011/0262796 A1 | 10/2011 | Shimooka et al. |
| 2011/0281175 A1 | 11/2011 | Hudson et al. |
| 2012/0100433 A1 | 4/2012 | Suyama et al. |
| 2012/0196189 A1 | 8/2012 | Babic et al. |
| 2012/0237834 A1 | 9/2012 | Ogasa |
| 2012/0247154 A1 | 10/2012 | Abramov et al. |
| 2012/0276439 A1 | 11/2012 | Fujita et al. |
| 2013/0026409 A1 | 1/2013 | Baker et al. |
| 2013/0085055 A1 | 4/2013 | Raj et al. |
| 2013/0122364 A1 | 5/2013 | Kim et al. |
| 2013/0122380 A1 | 5/2013 | Visco et al. |
| 2013/0177811 A1 | 7/2013 | Roffat et al. |
| 2013/0189562 A1 | 7/2013 | Dolle et al. |
| 2013/0216783 A1 | 8/2013 | Duan et al. |
| 2013/0230778 A1* | 9/2013 | Saimen ............. H01M 10/0525 |
| | | 429/303 |
| 2013/0260257 A1 | 10/2013 | Choi |
| 2013/0288875 A1 | 10/2013 | Miyagawa et al. |
| 2013/0344416 A1 | 12/2013 | Sakamoto et al. |
| 2014/0057153 A1 | 2/2014 | Visco et al. |
| 2014/0060723 A1 | 3/2014 | Herle et al. |
| 2014/0072870 A1 | 3/2014 | Otsuka et al. |
| 2014/0093785 A1 | 4/2014 | Sugiura et al. |
| 2014/0099538 A1 | 4/2014 | Johnson et al. |
| 2014/0113187 A1* | 4/2014 | Winoto ............. H01M 10/0525 |
| | | 429/189 |
| 2014/0120409 A1 | 5/2014 | Ouchi et al. |
| 2014/0120421 A1 | 5/2014 | Ouchi et al. |
| 2014/0134438 A1 | 5/2014 | Gadkaree et al. |
| 2014/0134483 A1 | 5/2014 | Ouchi et al. |
| 2014/0154586 A1 | 6/2014 | Hayashi et al. |
| 2014/0162113 A1 | 6/2014 | Ohta et al. |
| 2014/0170504 A1 | 6/2014 | Baek et al. |
| 2014/0186720 A1* | 7/2014 | Kintaka ............. C01G 25/006 |
| | | 429/322 |
| 2014/0193695 A1 | 7/2014 | Hoshina et al. |
| 2014/0205910 A1 | 7/2014 | Weppner et al. |
| 2014/0212728 A1 | 7/2014 | Kaneda et al. |
| 2014/0287305 A1 | 9/2014 | Wachsman et al. |
| 2014/0295287 A1 | 10/2014 | Eisele et al. |
| 2014/0377665 A1 | 12/2014 | Yoshida et al. |
| 2015/0015542 A1 | 1/2015 | Hou |
| 2015/0024292 A1 | 1/2015 | Yamada et al. |
| 2015/0037688 A1 | 2/2015 | Otsuka et al. |
| 2015/0044576 A1 | 2/2015 | Eisele et al. |
| 2015/0056520 A1 | 2/2015 | Thokchom et al. |
| 2015/0099188 A1* | 4/2015 | Holme ............. H01M 10/0562 |
| | | 429/231.95 |
| 2015/0099190 A1* | 4/2015 | Holme ................ C04B 35/117 |
| | | 429/322 |
| 2015/0130115 A1 | 5/2015 | Sung et al. |
| 2015/0180001 A1 | 6/2015 | Johnson et al. |
| 2015/0200420 A1 | 7/2015 | Holme et al. |
| 2015/0243974 A1 | 8/2015 | Holme et al. |
| 2015/0295274 A1 | 10/2015 | Engel et al. |
| 2015/0333307 A1 | 11/2015 | Thokchom et al. |
| 2016/0056500 A1 | 2/2016 | Holme et al. |
| 2016/0087321 A1 | 3/2016 | Wöhrle et al. |
| 2016/0111751 A1 | 4/2016 | Badding et al. |
| 2016/0149260 A1 | 5/2016 | Badding et al. |
| 2016/0172658 A1* | 6/2016 | Donnelly .......... C04B 35/62645 |
| | | 427/126.3 |
| 2016/0190639 A1 | 6/2016 | Sung et al. |
| 2016/0204466 A1 | 7/2016 | Nogami et al. |
| 2016/0211547 A1 | 7/2016 | Hwang et al. |
| 2016/0229701 A1 | 8/2016 | Heine et al. |
| 2016/0240887 A1 | 8/2016 | Hatta et al. |
| 2016/0244665 A1 | 8/2016 | Vosgroene et al. |
| 2016/0293988 A1 | 10/2016 | Sakamoto et al. |
| 2016/0308243 A1 | 10/2016 | Herle et al. |
| 2016/0308244 A1 | 10/2016 | Badding et al. |
| 2016/0375607 A1 | 12/2016 | Badding et al. |
| 2017/0005367 A1 | 1/2017 | Van Berkel et al. |
| 2017/0054139 A1 | 2/2017 | Kerkamm |
| 2017/0062873 A1* | 3/2017 | Iyer ..................... B30B 15/34 |
| 2017/0162901 A1 | 6/2017 | Chen et al. |
| 2017/0183265 A1 | 6/2017 | Badding et al. |
| 2017/0210634 A1 | 7/2017 | Badding et al. |
| 2017/0214048 A1 | 7/2017 | Qian et al. |
| 2017/0214084 A1 | 7/2017 | Lei et al. |
| 2018/0069263 A1 | 3/2018 | Holme et al. |
| 2018/0104848 A1 | 4/2018 | Badding et al. |
| 2018/0301754 A1* | 10/2018 | Badding ............... C04B 35/488 |
| 2018/0375149 A1* | 12/2018 | Beck ................ H01M 10/0562 |
| 2019/0077674 A1 | 3/2019 | Badding et al. |
| 2019/0207252 A1 | 7/2019 | Badding et al. |
| 2019/0214678 A1 | 7/2019 | Hwang et al. |
| 2019/0245178 A1* | 8/2019 | Cao ..................... H01M 50/46 |
| 2019/0260073 A1 | 8/2019 | Chao et al. |
| 2019/0363398 A1 | 11/2019 | Badding et al. |
| 2020/0031014 A1 | 1/2020 | Badding et al. |
| 2020/0144660 A1* | 5/2020 | Schneider ................ C03C 3/12 |
| 2020/0309454 A1 | 10/2020 | Kamei et al. |
| 2021/0047243 A1 | 2/2021 | Badding et al. |
| 2021/0202983 A1* | 7/2021 | Chao ..................... C04B 41/85 |
| 2021/0380430 A1 | 12/2021 | Badding et al. |
| 2021/0402646 A1 | 12/2021 | Badding et al. |
| 2022/0166062 A1 | 5/2022 | Kim et al. |
| 2022/0209288 A1 | 6/2022 | Badding et al. |
| 2022/0209289 A1 | 6/2022 | Badding et al. |

FOREIGN PATENT DOCUMENTS

| | | |
|---|---|---|
| CN | 101786873 A | 7/2010 |
| CN | 101933189 A | 12/2010 |
| CN | 102010183 A | 4/2011 |
| CN | 102280659 A | 12/2011 |
| CN | 103113107 A | 5/2013 |
| CN | 103117413 A | 5/2013 |
| CN | 109 378 525 A | 2/2019 |
| EP | 2 037 527 A1 | 3/2009 |
| EP | 3599068 A1 | 1/2020 |
| EP | 3408246 B1 | 2/2020 |
| JP | H02-111658 A | 4/1990 |
| JP | H11-012041 | 1/1999 |
| JP | 2000-128629 | 5/2000 |
| JP | 2001-31476 A | 2/2001 |
| JP | 2004-63261 A | 2/2004 |
| JP | 2006-8488 | 1/2006 |
| JP | 2009-203898 | 9/2009 |
| JP | 2010-102929 | 5/2010 |
| JP | 2010-176941 A1 | 8/2010 |
| JP | 2011/070939 A | 4/2011 |
| JP | 2012-031025 | 2/2012 |
| JP | 2012224520 A | 11/2012 |
| JP | 2012-243743 | 12/2012 |
| JP | 2013-107779 | 6/2013 |
| JP | 2013-134852 | 7/2013 |
| JP | 5273732 B2 | 8/2013 |
| JP | 5283188 B2 | 9/2013 |
| JP | 2013-214421 | 10/2013 |

(56) References Cited

FOREIGN PATENT DOCUMENTS

| | | |
|---|---|---|
| JP | 2014-2965 A | 1/2014 |
| JP | 2014-522331 | 9/2014 |
| JP | 2015-130481 A | 7/2015 |
| JP | 2015-215998 | 12/2015 |
| RU | 2483398 C1 | 5/2013 |
| WO | WO 81/02196 A1 | 8/1981 |
| WO | WO 2005/085138 A1 | 9/2005 |
| WO | WO 2009/038674 A2 | 3/2009 |
| WO | WO/2010/051345 A2 | 5/2010 |
| WO | WO 2011/038773 | 4/2011 |
| WO | WO 2012/114175 | 8/2012 |
| WO | WO 2013/010692 | 1/2013 |
| WO | WO 2013/128769 | 9/2013 |
| WO | WO 2015/054320 | 4/2015 |
| WO | WO 2015/076944 | 5/2015 |
| WO | WO 2016/069749 | 5/2016 |
| WO | WO 2017/131676 | 8/2017 |
| WO | WO 2017/197406 A1 | 11/2017 |
| WO | WO 2018/075972 A1 | 4/2018 |
| WO | WO/2018/118964 A1 | 6/2018 |
| WO | WO 2018/236394 | 12/2018 |
| WO | WO 2019/090360 | 5/2019 |
| WO | WO 2020/081718 | 4/2020 |
| WO | WO/2020/236767 A1 | 11/2020 |

OTHER PUBLICATIONS

Willmann et al., "Characteristics and evaluation criteria of substrate-based manufacturing. Is roll-to-roll the best solution for printed electronics?", Organic Electronics, 2014, vol. 15, pp. 1631-1640.
Olenick, "Ultra-Thin Flexible Ceramic Membranes for Electronic Applications", 46th International Symposium on Microelectronics (IMAPS 2013) | Sep. 30-Oct. 3, 2013 | Orlando, FL, USA; 5 pages.
Extended European search report of EP application No. 21187050.6 dated Jan. 7, 2022; 12 pages.
Agrawal et al., "Solid polymer electrolytes: materials designing and all-solid-state battery applications: an overview", Journal of Physics D: Applied Physics 41, 2008, 223001, 18 pages.
Ahmad et al., "Concentration and mobility of mobile Li+ions in $Li_6BaLa_2Ta_2O_{12}$ and $Li_5La_3Ta_2O_{12}$ garnet lithium ion conductors," J Mater Sci: Mater Electron, 2015, vol. 26, pp. 8136-8142.
Ahmad, Mohamad, "Lithium ionic conduction and relaxation dynamics of spark plasma sintered $Li_5La_3Ta_2O_{12}$ garnet nanoceramics", Ahmad Nanoscale Research Letters, 2015, 10:58, DOI: 10.1186/s11671-015-0777-7, 10 pages.
Ahn et al., "Local impedance spectroscopic and microstructural analyses of Al-in-diffused $Li_7La_3Zr_2O_{12}$," Journal of Power Sources, 2014, vol. 254, pp. 287-292.
Aleman et al., "Definitions of Terms Relating to the Structure and Processing of Sols, Gels, Networks, and Inorganic-Organic Hybrid Materials", Pure Appl. Chem., 2007, vol. 79, No. 10, pp. 1801-1829, Only for .97 case?.
Allen et al., "Effect of substitution (Ta, Al, Ga) on the conductivity of $Li_7La_3Zr_2O_{12}$", issued on Journal of Power Sources 2012, vol. 206, pp. 315-319.
Arora et al., "Battery Separators", Chemical Reviews, 2004, vol. 104, pp. 4419-4462.
Baek et al., "Garnet related lithium ion conductor processed by spark plasma sintering for all solid state batteries," Journal of Power Sources, 2014, vol. 249, pp. 197-206.
Baggetto et al., "High Energy Density All-Solid-State Batteries: A Challenging Concept Towards 3D Integration", Advanced Functional Materials, 2008, vol. 18, pp. 1057-1066.
Bernuy-Lopez et al., "Atmosphere Controlled Processing of Ga-Substituted Garnets for High Li-Ion Conductivity Ceramics," Chem. Mater. 2014, vol. 26, pp. 3610-3617.
Bonderer et al., "Free-Standing Ultrathin Ceramic Foils," Journal of the American Ceramic Society, 2010, vol. 93, No. 11, pp. 3624-3631.

Bruce et al., "Li—$O_2$ and Li—S batteries with high energy storage", Nature Materials, Jan. 2012, vol. 11, pp. 19-29.
Buschmann et al. "Lithium metal electrode kinetics and ionic conductivity of the solid lithium ion conductors "$Li_7La_3Zr_2O_{12}$" and $Li_{7-x}La_3Zr_{2-x}Ta_xO_{12}$ with garnet-type strucutre," Journal of Power Sources, 2012, vol. 206, pp. 236-244.
Buschmann et al., Structure and dynamics of the fast lithium ion conductor "$Li_7La_3Zr_2O_{12}$", Phys. Chem. Chem. Phys., 2011, vol. 13, p. 19378-19392.
Cao et al., "Effect of Sb—Ba codoping on the ionic conductivity of $Li_7La_3Zr_2O_{12}$ ceramic," Ceramics International, 2015, vol. 41, pp. 6232-6236.
Chen et al., "Origin of High Li+ Conduction in Doped $Li_7La_3Zr_2O_{12}$ Garnets," Chemistry of Materials, 2015, vol. 27, pp. 5491-5494.
Chen et al., "Sol-gel derived Li—La—Zr—O thin films as solid electrolytes for lithium-ion batteries", Journal of Materials Chemistry A, 2014, vol. 2, p. 13277-13282.
Cheng et al., "Effect of microstructure and surface impurity segregation on the electrical and electrochemical properties of dense Al-substituted $Li_7La_3Zr_2O_{12}$," J. Mater. Chem. A, 2014, vol. 2, pp. 172-181.
Cheng et al., "Effect of Surface Microstructure on Electrochemical Performance of Garnet Solid Electrolytes," ACS Appl. Mater. Interfaces, 2015, vol. 7, pp. 2073-2081.
Cheng et al., "Interrelationships among Grain Size, Surface Composition Air Stability, and Interfacial Resistance of Al-Substitued $Li_7La_3Zr_2O_{12}$ Solid Electrolytes," ACS Appl. Mater. Interfaces, 2015, vol. 7, pp. 17649-17655.
Cheng et al., "The origin of high electrolyte-electrode interfacial resistances in lithium cells containing garnet type solid electrolytes," Phys. Chem. Chem. Phys., 2014, vol. 16, pp. 18294-18300.
David et al., "Microstructure and Li-Ion Conductivity of Hot-Pressed Cubic $Li_7La_3Zr_2O_{12}$", J. Am. Cerami. Soc., 2015, pp. 1-6; DOI: 10.1111/jace.13455.
Deng et al., "Effect of the morphology of Li—La—Zr—O Solid electrolyte coating on the electrochemical performance of spinel $LiMn_{1.95}Ni_{0.05}O_{3.98}F_{0.02}$ cathode materials," J. Mater. Chem. A, 2014, vol. 2, pp. 18889-18897.
Dhivya et al., "Effect of Simultaneous Substitution of Y and Ta on the Stabilization of Cubic Phase, Microstructure, and $Li^+$Conductivity of $Li_7La_3Zr_2O_{12}$ Lithium Garnet," ACS Appl. Mater. Interfaces, 2014, vol. 6, pp. 17606-17615.
Dhivya et al., "$Li^+$transport properties of W substituted $Li_7La_3Zr_2O_{12}$ cubic lithium garnets," AIP Advances, 2013, vol. 3, pp. 082115.1-082115.21.
Djenadic, Ruzica et al., "Nebulized spray pyrolysis of Al-doped $Li_7La_3Zr_2O_{12}$ solid electrolyte for battery applications," Solid State Ionics, Oct. 2014, vol. 263, pp. 49-56.
Dong et al., "Electrochemical perofmrance and lithium-ion insertion/extraction mechanism studies of the novel $Li_2ZrO_3$ anode materials," Electrochimica Acta, 2015, vol. 161, pp. 219-225.
Duvel, Andre, et al., "Mechanosynthesis of Solid Electrolytes: Preparation, Characterization, and Li Ion Transport Properties of Garnet-Type Al-Doped $Li_7La_3Zr_2O_{12}$ Crystallizing with Cubic Symmetry," The Journal of Physical Chemistry, 2012, vol. 116, pp. 15192-15202.
English translation of the office action of Chinese application No. 201480055386.4 mailing date of Jan. 4, 2017; 9 pages.
Extended European Search Report dated Feb. 22, 2017 for European application No. 14864783.7; 9 pages.
Ferrese et al., "Lithium Redistribution in Lithium-Metal Batteries", Journal of The Electrochemical Society, 2012, vol. 159, pp. A1615-A1623.
Fries, R. et al., "Fabrication and properties of an anisotropic PZT/Polymer 0-3 composite," J. Mater. Sci.: Mater. in Electronics, 1994, vol. 5, pp. 238-243.
Fu et al., "Stabilizing the Garnet Solid-Electrolyte/Polysulfide Interface in Li-S Batteries", Chemistry of Materials, vol. 29, No. 19, Sep. 26, 2017, pp. 8037-8041.
Fu et al., "Toward Garnet electrolyte-based Li metal batteries: An ultrathin, highly effective, artificial solid-state electrolyte/metallic Li interface", Science Advances, vol. 3, No. 4, Apr. 7, 2017, pp. 1-11.

(56) References Cited

OTHER PUBLICATIONS

Geiger et al., "Crystal Chemistry and Stability of "$Li_7La_3Zr_2O_2$" Garnet: A Fast Lithium-Ion Conductor," Inorganic Chemistry, 2011, vol. 50, pp. 1089-1097.

Goodenough, John, B., "Solid Electrolytes for Next Generation Batteries," Texas Materials Institute, The University of Texas at Austin, May 14-18, 2012, DOE Vehicle Technologies Annual Merit Review Meeting, 18 pages.

Gorte et al., "Anodes for Direct Oxidation of Dry Hydrocarbons in a Solid-Oxide Fuel Cell", Advanced Materials, Oct. 2, 2000, vol. 12, No. 19, pp. 1465-1469.

Gu et al., "Effects of penta-and trivalent dopants on structures and conductivity $Li_7La_3Zr_2O_{12}$," Solid State Ionics, 2015, vol. 274, pp. 100-105.

Han et a., "Experimental visualization of lithium conduction pathways in garnet-type $Li_7La_3Zr_2O_{12}$", Chem. Commun., 2012, vol. 48, pp. 9840-9842.

Hayashi et al., "New Phases in $La_2O_3$—$Li_2O$—$Ta_2O_5$ System", Mat. Res. Bull. 1986, vol. 21, No. 3, pp. 289-293.

Herrmann et al., "Micro-segregation in liquid phase sintered silicon carbide ceramics," Journal of the European Ceramic Society, Apr. 1, 2010, vol. 30, pp. 1495-1501.

Hitz et al., "Highly Li-Stuffed Garnet-Type $Li_{7+x}La_3Zr_{2-x}Y_xO_{12}$", Journal of The Electrochemical Society, 2013, vol. 160, No. 8, pp. A1248-A1255.

Hyooma et al., "Crystal Structures of $La_3Li_5M_2O_{12}$ (M=Nb, Ta)", Mat. Res. Bull. 1988, vol. 23, No. 10, pp. 1399-1407.

International Search Report and Written Opinion mailed Apr. 15, 2016 in PCT/US2016/015209, 14 pages.

International Search Report and Written Opinion mailed Dec. 1, 2016 in PCT/US2016/043428, 11 pages.

International Search Report and Written Opinion mailed Mar. 10, 2015 in PCT/US2014/059578, 15 pages.

International Search Report and Written Opinion mailed Mar. 23, 2015 in PCT/US2014/059575, 16 pages.

Ishiguro et al., "Stability of Nb-Doped Cubic $Li_7La_3Zr_2O_2$ with Lithium Metal," Journal of the Electrochemical Society, 2013, vol. 160, No. 10, pp. A1690-A1693.

Ito, Seitaro et al., "A rocking chair type all-solid-state lithium ion battery adopting $Li_2O$—$ZrO_2$ coated $LiNi_{0.8}Co_{0.15}Al_{0.05}O_2$ and a sulfide based electrolyte," Journal of Power Sources, 248, 2014, pp. 943-950.

Jalem et al., "Effects of Gallium doping in Garnet-Type $Li_7La_3Zr_2O_{12}$ Solid Electrolytes," Chemistry of Materials, 2015, vol. 27, pp. 2821-2831.

Jalem et al., "Insights into the Lithium-Ion Conduction Mechanism of Garnet-Type Cubic $Li_5La_3Ta_2O_{12}$ by ab-Initio Calculations," J. Phys. Chem. C 2015, vol. 119, pp. 20783-20791.

Janani et al., "Influence of sintering additives on densification and $Li^+$conductivity of Al doped $Li_7La_3Zr_2O_{12}$ lithium garnet," RSC Adv. 2014, vol. 4, pp. 51228-51238.

Janani et al., "Optimization of Lithium Content and Sintering Aid for Maximized Li+ Conductivity and Density in Ta-Doped $Li_7La_3Zr_2O_{12}$," J. Am. Ceram. Soc., 2015, pp. 1-8; DOI: 10.1111/jace.13578.

Jin et al., "Al-doped $Li_7La_3Zr_2O_2$ synthesized by a polymerized complex method," Journal of Power Sources, 2011, vol. 196, pp. 8683-8687.

Jung et al., "Ceramic separators based on Li+-conducting inorganic electrolyte for high-performance lithium-ion batteries with enhanced safety," Journal of Power Sources, 2015, vol. 293, pp. 675-683.

Kang et al., "First-Principles Study of Chemical Stability of Lithium Oxide Garnets $li_7La_3M_2O_{12}$ (M = Zr, Sn, or Hf)," The Journal of Physical Chemistry C, 2014, vol. 118 (31), pp. 17402-17406.

Kato et al., "Preparation of thick-film electrode-solid electrolyte composites on $Li_7La_3Zr_2O_{12}$ and their electrochemical properties," Journal of Power Sources, 303, 2016, pp. 65-72.

Katsui et al., "Preparation of cubic and tetragonal $Li_7La_3Zr_2O_{12}$ flim by metal organic chemical vapor deposition," Thin Solid Films, vol. 584, Jun. 1, 2015, pp. 130-134.

KC et al., "Point defects in garnet-type solid electrolyte (c—$Li_7La_3Zr_2O_{12}$ ) for Li-ion batteries," Solid State Ionics, 2014, vol. 261, pp. 100-105.

Kerman et al. "Review—Practical Challenges Hindering the Development of Solid State Li Ion Batteries", Journal of the Electrochemical Society, 2017, vol. 164. No. 7, pp. A1731-A1744.

Kerman et al., "Complex oxide nanomembranes for energy conversion and storage: A review", Journal of Materials Research, vol. 29, No. 3, Feb. 14, 2014, pp. 320-337.

Kihira et al., "Effect of Simultaneous Substitution of Alkali Metals and Nb in $Li_7La_3Zr_2O_{12}$ on Lithium-Ion Conductivity," ECS Electrochemistry Letters, 2013, vol. 2, No. 7, pp. A56-A59.

Kim et al., "Characterization of the interface between $LiCoO_2$ and $Li_7La_3Zr_2O_{12}$ in an all-solid-state rechargeable lithium battery," Journal of Power Sources, 2011, vol. 196, pp. 764-767.

Kim et al., "Epitaxial growth and lithium ion conductivity of lithium-oxide garnet for an all solid-state battery electrolyt eț", Dalton Transactions, 2013, vol. 42, pp. 13112-13117.

Kim et al., "The Effect of Relative Density on the Mechanical Properties of Hot-Pressed Cubic $Li_7La_3Zr_2O_{12}$," J. Am. Ceram. Soc., 2016, pp. 1-8.; DOI: 10.1111/jace.14084.

Klenk et al., "Local structure and dyanmics of lithium garnet ionic conductors: tetragonal and cubic $Li_7La_3Zr_2O_7$," Phys. Chem. Chem. Phys., 2015, vol. 17, pp. 8758-8768.

Kokal et al., "Preparation and characterization of three dimensionally ordered macroporous $Li_5La_3Ta_2O_{12}$ by colloidal crystal templating for all-solid-state lithium-ion batteries," Ceramics International, 2015, vol. 41, pp. 737-741.

Kokal et al., "Sol-gel synthesis and lithium ion conductivity of $Li_7La_3Zr_2O_{12}$ with garnet-related type structure," Solid State Ionics, 2011, vol. 185, pp. 42-46.

Kong et al., "Transparent Ceramics, Topics in Mining," Springer International Publishing Switzerland, 2015, Metallurgy and Materials Engineering, DOI 10.1007/978-3-319-18956-7_2; pp. 29-91.

Kotobuki et al., "Compatibility of $Li_7La_3Zr_2O_{12}$ Solid Electrolyte to All-Solid-State Battery Using Li Metal Anode", Journal of the Electrochemical Society, 2010, vol. 157, No. 10, pp. A1076-A1079.

Kotobuki et al., "Preparation of Sintered $Li_5La_3Nb_2O_{12}$ Garnet-type Li Ion Conductor via Spark Plasma Sintering Synthesis," Int. J. Electroact. Mater. 2014, vol. 2, pp. 17-21.

Kotobuki et al., "Fabrication of all-solid-state lithium battery with lithium metal anode using $Al_2O_3$-added $Li_7La_3Zr_2O_{12}$ solid electrolyte," Journal of Power Sources, 2011, vol. 196, pp. 7750-7754.

Lai et al., "Ultrahigh-Energy-Density Microbatteries Enabled by New Electrode Architecture and Micropackaging Design," Adv. Mater., 2010, vol. 22, pp. E139-E144.

Lallemant et al., "Transparent polycrystalline alumina obtained by SPS: Green bodies processing effect," Journal of the European Ceramic Society, 2012, vol. 32, pp. 2909-2915.

Langer et al., "Syntheis of single phase cubic Al-substituted $Li_7La_3Zr_2O_{12}$ by solid state lithiation of mixed hydroxides," Journal of Alloys and Compounds, 2015, vol. 645, pp. 64-69.

Lau et al., "Density Functional Investigation of the Thermodynamic Stability of Lithium Oxide Bulk Crystalline Structures as a Function of Oxygen Pressure", J. Phys. Chemistry C, 2011, vol. 115, pp. 23625-23633.

Lee et al., "High lithium ion conductivity of $Li_7La_3Zr_2O_{12}$ synthesized by solid state reaction," Solid State Ionics, 2014, vol. 258, pp. 13-17.

Li et al., "Optimizing Li conductivity in a garnet framework," J. Mater. Chem., 2012, vol. 22, pp. 15357-15361.

Li et al., "The reaction of $Li_{6.5}La_3Zr_{1.5}Ta_{0.5}O_{12}$ with water," Solid State Ionics, 2015, vol. 269, pp. 57-61.

Li et al., "W-Doped $Li_7La_3Zr_2O_{12}$ Ceramic Electrolytes for Solid State Li-ion Batteries," Electrochimica Acta, 2015, vol. 180, pp. 37-42.

Liu et al., "High Ion Conductivity in Garnet-type F-doped $Li_7La_3Zr_2O_{12}$," Journal of Inorganic Materials, Sep. 2015, vol. 30, No. 9, pp. 995-1001.

(56) References Cited

OTHER PUBLICATIONS

Liu et al., "Reversible ion exchange and structural stability of garnet-type Nb-doped $Li_7La_3Zr_2O_{12}$ in water for applications in lithium batteries," Journal of Power Sources, 2015, vol. 282, pp. 286-293.
Liu et al., "Achieving high capacity in bulk-type solid-state lithium ion battery based on $Li_{6.75}La_3Zr_{1.75}Ta_{0.25}O_{12}$ electrolyte: Interfacial resistance," Journal of Power Sources, 2016, vol. 324, pp. 349-357.
Matsuda et al., "Phase formation of a garnet-type lithium-ion conductor $Li_{7-3x}Al_xLa_3Zr_2O_{12}$," Solid State Ionics, 2015, vol. 277, pp. 23-29.
Matsui et al., "Phase stability of a garnet-type lithium ion conductor $Li_7La_3Zr_2O_{12}$," The Royal Society of Chemistry, Dalton Transactions, 2014, vol. 43, pp. 1019-1024.
Matsui et al., "Phase transformation of the garnet structured lithium ion conductor: $Li_7La_3Zr_2O_{12}$", Solid State Ionics, 2014, vol. 262, pp. 155-159.
McCloskey et al., "On the Mechanism of Nonaqueous $Li-O_2$ Electrochemistry on C and Its Kinetic Overpotentials: Some Implications for Li-Air Batteries", J. Phys. Chemistry C, 2012, vol. 116, pp. 23897-23905.
Miara et al., "Effect of Rb and Ta Doping on the Ionic Conductivity and Stability of the Garnet $Li_{7+2x-y}(La_{3-x}Rb_x)(Zr_{2-y}Ta_y)O_{12}$ ($0 \leq x \leq 0.375$, $0 \leq y \leq 1$) Superionic Conductor: A First Principles Investigation," Chem. Mater. 2013, vol. 25, pp. 3048-3055.
Miara et al., "First-Principles Studies on Cation Dopants and Electrolyte |Cathode Interphases for Lithium Garnets," Chemestry of Materials, 2015, vol. 27, pp. 4040-4047.
Minami et al., "Crystallization Process for Superionic $Li_7P_3S_{11}$ Glass-Ceramic Electrolytes", Journal of the American Ceramic Society, 2011, vol. 94, pp. 1779-1783.
Mitterdorfer et al., "Fabrication of thin electrolytes for second-generation solid oxide fuel cells," Solid State Ionics, 2000, vol. 131, pp. 79-96.
Miyauchi et al., "New Amorphous Thin Films of Lithium Ion Conductive Solid Electrolyte," Solid State Ionics 9 & 10, 1983, pp. 1469-1472.
Mizuno et al., "Environmentally Friendly Flux Growth of High-Quality, Idiomorphic $Li_5La_3Nb_2O_{12}$ Crystals," Cryst. Growth Des., 2013, vol. 13, pp. 479-484.
Moshkovich et al., "The study of the anodic stability of alkyl carbonate solutions by in situ FTIR spectroscopy, EQCM, NMR and MS," Journal of Electroanalytical Chemistry, 2001, vol. 497, pp. 84-96.
Mukhopadhyay et al., "Structure and Stoichiometry in Supervalent Doped $Li_7La_3Zr_2O_{12}$," Chem. Mater., 2015, vol. 27, pp. 3658-3665.
Murugan et al., "Schnelle Lithiumionenleitung in granatartigem $Li_7La_3Zr_2O_{12}$", Angew. Chem., 2007, vol. 119, pp. 7925-7928, with English translation—"Fast Lithium Ion Conduction in Garnet-Type $Li_7La_3Zr_2O_{12}$", Angew. Chem. Int. Ed., 2007, vol. 46, pp. 7778-7781.
Narayanan et al., "Dopant Concentration-Porosity-Li-Ion Conductivity Relationship in Garnet-Type $Li_{5+2x}La_3Ta_{2-x}Y_xO_{12}$ ($0.05 \leq x < 0.75$) and Their Stability in Water and 1 M LiCl," Inorganic Chemistry, 2015, vol. 54, pp. 6968-6977.
Nemori et al., "Stability of garnet-type solid electrolyte $Li_xLa_3A_{2-y}B_yO_{12}$ (A=Nb or Ta, B = Sc or Zr)," Solid State Ionics, 2015, vol. 282, pp. 7-12.
Neudecker et al., "'Lithium-Free' Thin-Film Battery with In Situ Plated Li Anode," Journal of The Electrochemical Society, 2000, vol. 147, No. 2, pp. 517-523.
Ni et al., "Room temperature elastic moduli and Vickers hardness of hot-pressed LLZO cubic garnet," J. Mater. Sci., 2012, vol. 47, pp. 7978-7985.
Nyman et al., "Alternative Approach to Increasing Li Mobility in Li—La—Nb/Ta Garnet Electrolytes," Chem. Mater., 2010, vol. 22, No. 19, pp. 5401-5410.
Office Action of Chinese application No. 201480055387.9 mailing date of Dec. 22, 2016 together with English translation; 7 pages.
Office Action of Japanese application No. 2016-520586 mailing date of Nov. 28, 2017 together with English translation; 8 pages.
Ohta et al., "Co-sinterable lithium garnet-type oxide electrolyte with cathode for all-solid-state lithium ion battery," Journal of Power Sources, 2014, vol. 265, pp. 40-44.
Ohta et al., "High lithium ionic conductivity in the garnet-type oxide $Li_{7-x}La_3(Zr_{2-x}, Nb_x)O_{12}(X=0-2)$," Journal of Power Sources, 2011, vol. 196, pp. 3342-3345.
Ohta et al., "All-solid-state lithium ion battery using garnet-type oxide and $Li_3BO_3$ solid electrolytes fabricated by screen-printing," Journal of Power Sources, vol. 238, 2013, pp. 53-56.
Ohta et al., "Electrochemical performance of an all-solid-state lithium ion battery with garnet-type oxide electrolyte," Journal of Power Sources, vol. 202, 2012, pp. 332-335.
Onodera et al., "Flux Growth of Idiomorphic Garnet-Type Solid Electrolyte Crystals for All-Solid-State Lithium-Ion Rechargeable Batteries," The Electrochemical Society, 2012, Abstract #1198, 1 page.
Park et al., "Effects of crystallinity and impurities on the electrical conductivity of Li—La—Zr—O thin films," Thin Solid Films, 2015, vol. 576, pp. 55-60.
Peng et al., "A Reversible and Higher-Rate $Li-O_2$ Battery", Science, Aug. 3, 2012, vol. 337, pp. 563-567.
Puech et al., "Elaboration and characterization of a free standing LiSICON membrane for aqueous lithiumeair battery," Journal of Power Sources, 2012, vol. 214, pp. 330-336.
Quartarone et al., "Electrolytes for solid-state lithium rechargeable batteries: recent advances and perspectives", Chemical Society Reviews, vol. 40, 2011, pp. 2525-2540.
Ramakumar et al., "Structure and Li+ dyanmics of Sb-doped $Li_7La_3Zr_2O_{12}$ fast lithium ion conductors," Phys. Chem. Chem. Phys. 2013, vol. 15, pp. 11327-11338.
Ramzy et al., "Tailor-Made Development of Fast Li Ion Conducting Garnet-Like Solid Electrolytes," American Chemical Society, Applied Materials and Interfaces, 2010, vol. 2, No. 2, pp. 385-390.
Rangasamy et al., "A High Conducting Oxide—Sulfide Composite Lithium Superionic Conductor," J. Mater. Chem. A, published 2014, vol. 2, pp. 4111-4116.
Rangasamy et al., "The effect of 24c-site (A) cation substitution on the tetragonal-cubic phase transition in $Li_{7-x}La_{3-x}A_xZr_2O_{12}$ garnet-based ceramic electrolyte," Journal of Power Sources, 2013, vol. 230, pp. 261-266.
Rangasamy et al., "The role of Al and Li concentration on the formation of cubic garnet solid electrolyte of nominal composition $Li_7La_3Zr_2O_{12}$," Solid State Ionics, 2012, vol. 206, pp. 28-32.
Rao et al., "In Situ Neutron Diffraction Monitoring of $Li_7La_3Zr_2O_{12}$ Formation: Toward a Rational Synthesis of Garnet Solid Electrolytes," Chemistry of Materials, 2015, vol. 27, pp. 2903-2910.
Raskovalov et al., "Structure and transport properties of $L1_7La_3Zr_{2-0.75x}Al_xO_{12}$ supersonic solid electrolytes," Journal of Power Sources, 2013, vol. 238, pp. 48-52.
Reed, James S., Principles of Ceramics Processing, 2nd Edition, John Wiley & Sons, Inc., New York, Jan. 1995, pp. 60-61.
Reinacher et al., "Preparation an electrical properties of garnet-type $Li_6BaLa_2Ta_2O_{12}$ lithium solid electrolyte thin films prepared by pulsed laser deposition," Solid State Ionics, 2014, vol. 258, pp. 1-7.
Ren et al., "Direct observation of lithium dendrites inside garnet-type lithium-ion solid electrolyte," Electrochemistry Communications, 2015, vol. 57, pp. 27-30.
Ren et al., "Effects of Li source microstructure and ionic conductivity of Al-contained $Li_{6.75}La_3Zr_{1.75}Ta_{0.25}O_{12}$ cermics," Journal of the European Ceramic Society, 2015, vol. 35, pp. 561-572.
Rettenwander et al., "Site Occupation of Ga and Al in Stabilized Cubic $Li_{7-3(x+y)}Ga_xAl_yLa_3Zr_2O_{12}$ Garnets As Deduced from $^{27}Al$ and $^{71}Ga$ MAS NMR at Ultrahigh Magnetic Fields," Chemistry of Materials, 2015, vol. 27, pp. 3135-3142.
Rettenwander et al., "Synthesis, Crystal Chemistry, and Electrochemical Properties of $Li_{7-2x}La_3Zr_{2-x}Mo_xO_{12}$ (x =0.1-0.4): Stabilization of the Cubic Garnet Polymorph via Substitution of $Zr^{4+}$ by $Mo^{6+}$," Inorganic Chemistry, 2015, vol. 54, pp. 10440-10449.
Rettenwander et al., "DFT study of the role of $Al^{3+}$ in the fast ion-conductor $Li_{7-3x}Al^{3+x}La_3Zr_2O_{12}$ Garnet," Chem. Mater. 2014, vol. 26, pp. 2617-2623.

(56) References Cited

OTHER PUBLICATIONS

Rosero-Navarro et al., "Preparation of $Li_7La_3(Zr_2-xNb_x)O_{12}$ (x= 0-1.5) and $Li_3BO_3/LiBO_2$ composites at low temperatures using a sol-gel process," Solid State Ionics, 2016, vol. 285, pp. 6-12.
Sakamoto et al., "Synthesis of nano-scale fast ion conducting cubic $Li_7La_3Zr_2O_{12}$ ", Nanotechnology, 2013, vol. 24, 424005, 8 pages.
Sakamoto, Jeff, "Garnet-based ceramic electrolyte: Enabling Li metal anodes and solid state batteries," Beyond Lithium Ion VI, Jun. 4-6, 2013, Boulder, CO., 36 pages.
Sakuda et al., "Evaluation of elastic modulus of $Li_2S—P_2S_5$ glassy solid electrolyte by ultrasonic sound velocity measurement and compression test", Journal of the Ceramic Society of Japan 121, 2013, pp. 946-949.
Schafbauer et al., "Tape Casting as a Multi Purpose Shaping Technology for Different Applications in Energy Issues", Materials Science Forum vols. 706-709, 2012, pp. 1035-1040.
Schmidt et al., "In-situ, non-destructive acoustic characterization of solid state electrolyte cells", Journal of Power Sources, 2016, vol. 324, pp. 126-133.
Second Office Action of Chinese Application No. 201480055386.4 mailing date of Nov. 1, 2017 together with English translation, 10 pages.
Sharafi et al., "Characterizing the $Li—Li_7La_3Zr_2O_{12}$ interface stability and kinetics as a function of temperature and current density," Journal of Power Sources, 2016, vol. 302, pp. 135-139.
Shimonishi et al., "Synthesis of garnet-type $Li_{7-x}La_3Zr_2O_{12-1/2x}$ and its stability in aqueous solutions," Solid State Ionics, 2011, vol. 183, pp. 48-53.
Shin et al., "Synergistic multi-doping effects on the $Li_7La_3Zr_2O_{12}$ solid electrolyte for fast lithium ion conduction," Scientific Reports, 5:18053; DOI: 10.1038/srep18053, 2015, pp. 1-9.
Song et al., "Crystal structure, migration mechanism and electrochemical performance of Cr-stabilized garnet," 2014, vol. 268, pp. 135-139.
Suárez et al., "Sintering to Transparency of Polycrystalline Ceramic Materials", Mar. 2012, ISBN: 978-953-51-0017-1, 28 pages; InTech, Available from: http://www.intechopen.com/books/sintering-of-ceramics-new-emerging-techniques/sintering-to-transparencyof-polycrystalline-ceramic-materials.
Sudo et al., "Interface behavior between garnet-type lithium-conducting solid electrolyte and lithium metal," Solid State Ionics, 2014, vol. 262, pp. 151-154.
Suzuki et al., "Transparent cubic garnet-type solid electrolyte of $Al_2O_3$-doped $Li_7La_3Zr_2O_{12}$," Solid State Ionics, 2015, vol. 278, pp. 172-176.
Tadanaga et al., "Low temperature synthesis of highly ion conductive $Li_7La_3Zr_2O_{12}$ —$Li_3BO_3$ composites," Electrochemistry Communications, 2013, vol. 33, pp. 51-54.
Takada, "Progress and prospective of solid-state lithium batteries", Acta Materialia 61, 2013, pp. 759-770.
Takeda et al., "High Pressure Form of Fluoride Garnets $Na_3M_2Li_3F_{12}$ (M= & Fe)," Mat. Res. Bull., 1977, vol. 12, No. 7, pp. 689-692.
Tan et al., "Fabrication and characterization of $Li_7La_3Zr_2O_{12}$ thin films for lithium ion battery," ECS Solid Sate Letters, vol. 1, No. 6, Oct. 3, 2012, pp. Q57-Q60.
Teng, Shiang, et al., "Recent Developments in garnet based solid state electrolytes for thin film batteries," Current Opinion in Solid State and Materials Science, Feb. 2014, vol. 18, Issue 18, pp. 29-38.
Thangadurai et al., "Fast Solid-State Li Ion Conducting Garnet-Type Structure Metal Oxides for Energy Storage," J. Phys. Chem. Lett, 2015, vol. 6, pp. 292-299.
Thangadurai et al., "$Li_6AL_{a2}N_0_{12}$ (A=Ca, Sr, Ba): A New Class of Fast Lithium Ion Conductors with Garnet-Like Structure," J. Am. Ceram. Soc., 2005, vol. 88, No. 2, pp. 411-418.
Thangadurai et al., "Novel Fast Lithium Ion Conduction in Garnet-Type $Li_5La_3M_2O_{12}$ (M = NB, Ta)," J. Am. Ceram. Soc., 2003, vol. 86, No. 3, pp. 437-440.
Thangadurai et al., "Garnet-type solid-state fast Li ion conductors for Li batteries: critical review", Chemical Society Reviews, 2014, vol. 43, pp. 4714-4727.

Thompson et al., "A Tale of Two Sites: On Defining the Carrier Concentration in Garnet-Based Ionic Conductors for Advanced Li Batteries," Adv. Energy Mater., 2015, 1500096, pp. 1-9.
Toda, S., et al., "Low temperature cubic garnet-type $CO_2$-doped $Li_7La_3Zr_2O_{12}$," Solid State Ionics, 2013, vol. 233, pp. 102-106.
Tong et al., "Highly Conductive Li Garnets by a Multielement Doping Strategy", Inorganic Chemistry, 2015, vol. 54, pp. 3600-3607.
Ulissi, Ulderico et al., "All solid-state battery using layered oxide cathode, lithium-carbon composite anode and thio-LISICON electrolyte," Solid State Ionics, vol. 296, 2016, pp. 13-17.
Wainwright et al., "Forces generated by anode growth in cylindrical $Li/MoS_2$ cells," Journal of Power Sources, 1991, vol. 34, pp. 31-38.
Wang et al., "Correlation and mechanism of lithium ion diffusion with the crystal strcutre of $Li_7La_3Zr_2O_{12}$ revealed by an internal friction technique," Phys. Chem. Chem. Phys., 2014, vol. 16, pp. 7006-7014.
Wang et al., "The synergistic effects of al and Te on the structure and Li+-mobility of garnet-type solid electrolytes", J. Mater. Chem. A. 2014, vol. 2, pp. 20271-20279.
Wang et al., "Transparent ceramics: Processing, materials and applications," Progress in Solid State Chemistry, 2013, vol. 41, pp. 20-54.
Wang, Dawei et al., "Toward Understanding the Lithium Transport Mechanism in Garnet-type Solid Electrolytes: Li+ Ion Exchanges and Their Mobility at Octahedral/Tetrahedral Sites," Chem. Mater. 2015, vol. 27, pp. 6650-6659.
Wang, Shutao et al., "Syntheses and structures of lithium zirconates for high-temperature $CO_2$ absorption," J. Mater. Chem. A, 2013, vol. 1, pp. 3540-3550.
Wang, Yuxing et al., "Phase transition in lithium garnet oxide ionic conductors $Li_7La_3Zr_2O_{12}$: The role of Ta substitution and $H_2O/CO_2$ exposure," Journal of Power Sources, 2015, vol. 275, pp. 612-620.
Wilkinson et al., "Effects of physical constraints on Li cycability," Journal of Power Sources, 1991, vol. 36, pp. 517-527.
Wolfenstine et al., "A preliminary investigation of fracture toughness of $Li_7La_3Zr_2O_{12}$ and its comparisoin to other solid Li-ion conductors," Materials letters, 2013, vol. 96, pp. 117-120.
Wolfenstine et al., "Chemical stability of cubic $Li_7La_3Zr_2O_{12}$ with molten lithium at elevated temperature", J. Mater. Sci., 2013, vol. 48, pp. 5846-5851. DOI 10.1007/s10853-013-7380-z.
Xie et al., "Lithium Distribution in Aluminum-Free Cubic $Li_7La_3Zr_2O_{12}$", issued on Chem. Mater. 2011, vol. 23, pp. 3587-3589.
Xie et al., "Low-temperature synthesis of $Li_7La_3Zr_2O_{12}$ with cubic garnet-type structure," Materials Research Bulletin, 2012, vol. 47, pp. 1229-1232.
Xu et al., "Multistep sintering to synthesize fast lithium garnets," Journal of Power Sources, 2016, vol. 302, pp. 291-297.
Yang et al., "Nanostructured Garnet-Type Solid Electrolytes for Lithium Batteries: Electrospinning Synthesis of $Li_7La_3Zr_2O_{12}$ Nanowires and Particle Size-Dependent Phase Transformation", J.Physical Chemistry C, 2015, vol. 119, pp. 14947-14953.
Yi et al., "Flame made nanoparticles permit processing of dense, flexible, Li+ conducting ceramic electrolyte thin films of cubic-$Li_7La_3Zr_2O_{12}$ (c-LLZO) ", J. Mater. Chem. A, 2016, vol. 4, pp. 12947-12954.
Yoshima et al., "Thin hybrid electrolyte based on garnet-type lithium-ion conductor $Li_7La_3Zr_2O_{12}$ for 12 V-class bipolar batteries," Journal of Power Sources, 2016, vol. 302, pp. 283-290.
Zaiss et al., "Fast ionic conduction in cubic hafnium garnet $Li_7La_3Hf_2O_{12}$," Ionics, Springer-Verlag, 2010, vol. 16, pp. 855-858.
Zhang et al., "Effect of lithium ion concentration on the microstructure evolution and its association with the ionic conductivity of cubic garnet-type nominal $Li_7Al_{0.25}La_3Zr_2O_{12}$ solid electrolytes", Solid State Ionics, 2016, vol. 284, pp. 53-60.
Zhang et al., "Field assisted sintering of dense Al-substituted cubic phase $Li_7La_3Zr_2O_{12}$ solid electrolytes", Journal of Power Sources, 2014, vol. 268, pp. 960-964.
Zhang et al., "Preparation of cubic $Li_7La_3Zr_2O_{12}$ solid electrolyte using a nano-sized core-shell structured precursor", Journal of Alloys and Compounds, 2015, vol. 644, pp. 793-798.

(56) References Cited

OTHER PUBLICATIONS

Reppert T. et al., "$Li_7La_3Zr_2D_{12}$ electrolyte for all-solid-state batteries", Future Energy, Oct. 17, 2014, pp. 1-1, XP055813972, Retrieved from the Internet: URL:https://juser.fz-juelich.de/record/171892/files/FZJ-2014-05448.pdf [retrieved on Jun. 15, 2021].

Reppert T. et al., "Oxide-ceramic electrolyte layers for all-solid-state lithium batteries", Jan. 21, 2015, pp. 1-1, XP055814028, Retrieved from the Internet: URL:https://juser.fz-juelich.de/record/188042/files/FZJ-2015-01520.pdf.

Cheng et al., "Measurement of the Sintering Pressure in Ceramic Films", J. Am. Ceram. Soc., 1988, vol. 71, No. 4, pp. 276-280.

Cologna et al., "Effect of Al and Ce doping on the deformation upon sintering in sequential tape cast layers for solid oxide fuel cells", Journal of Power Sources, vol. 193, 2009, pp. 80-85.

Cologna et al., "Vertical sintering to measure the uniaxial viscosity of thin ceramic layers", Acta Materialia, vol. 58, 2010, pp. 5558-5564.

Gotschel et al., "Processing of preceramic paper and ceramic green tape derived multilayer structures", Advances in Applied Ceramics, vol. 112, No. 6, 2013, pp. 358-365.

Han et al., "Control of shrinkage on the behavior of co-firing of ferrite and varistor multi-layers composite with organic content", J Electroceram, 2009, vol. 23, pp. 559-563.

Muralidharan et al., "Optimization of process parameters for the production of Ni—Mn—Co—Fe based NTC chip thermistors through tape casting route", Journal of Alloys and Compounds, 2011, vol. 509, pp. 9363-9371.

Yang et al., "Tape-casted transparent alumina ceramic wafers", J. Mater. Res., Oct. 14, 2014, vol. 29, No. 19, pp. 2312-2317.

Yu et al., "Experimental determination of the uniaxial viscosity of low-temperature co-fired ceramic tapes by vertical sintering", Ceramics International, 2014, vol. 40, pp. 9367-9375.

Hu et al., "Highly conductive paper for energy-storage devices", PNAS, Dec. 22, 2009, vol. 106, No. 51, pp. 21490-21494; www.pnas.org/cgi/doi/10.1073/pnas.090885810.

Wang et al., "A general method to synthesize and sinter bulk ceramics in seconds", Science 368, (2020) May 1, 2020, pp. 521-526.

Cheng J. et al., "On the green density sintering behavior and electrical property of tape cast $Ce_{0.9}Gd_{0.1}O_{1.95}$ electrolyte films", Materials Research Bulletin, Dec. 1, 2002, vol. 37, No. 15, pp. 2437-2446, XP004395782.

Gurauskis et al., "Laser drilling of Ni-YSZ cermets", Journal of the European Ceramic Society, Oct. 1, 2008, vol. 28, No. 14, pp. 2671-2680, XP023610743.

Rauscher et al. "Steel-sheet fabrication by tape casting, Low Temperature Cofired Ceramics LTCC View project Colloidal Processing View project", International Journal of Powder Metallurgy, vol. 44, No. 6, 2008, 11 pages.

English translation of the First office Action of Chinese patent Application No. 202111593888.0 dated Oct. 31, 2022; 15 pages.

Yi et al., "Key parameters governing the densification of cubic-$Li_7La_{3Zr-2}O_{12}Li+$conductors", Journal of Power Sources, Elsevier SA, CH, vol. 352, Mar. 31, 2017, pp. 156-164.

Preliminary Rejection of Korean Patent Application No. 10-2021-7024341 dated Nov. 8, 2021 with the English translation.

Office Action of the JP Patent Application No. 2022-091043 dated May 16, 2023, and its English translation, 19 pages.

Awaka et al., "Synthesis and structure analysis of tetragonal $Li_7La_3Zr_2O_{12}$ with the garnet-related type structure", Journal of Solid State Chemistry 182 (2009) 2046-2052.

Lu et al., "Electrochemical performance of $LiCoO_2$ cathodes by surface modification using lanthanum aluminum garnet", Journal of Power Sources 184 (2008) 392-401; doi:10.1016/j.jpowsour.2008.04.087.

Ramaswamy et al., "Fast Lithium Ion Conduction in Garnet-Type $Li_7La_3Zr_2O_{12}$", Angew. Chem. Int. Ed. 2007, 46, 7778-7781; DOI: 10.1002/anie.200701144.

Office action of Chinese Patent application No. 202010759223.1 dated May 30, 2024 and its English translation.

\* cited by examiner

PROCESSES AND MATERIALS FOR CASTING AND SINTERING GREEN GARNET THIN FILMS

This application is a continuation of U.S. patent application Ser. No. 15/216,636, entitled PROCESSES AND MATERIALS FOR CASTING AND SINTERING GREEN GARNET THIN FILMS, filed Jul. 21, 2016, which claims priority to, and the benefit of, U.S. Provisional Patent Application No. 62/195,172, entitled PROCESSES AND MATERIALS FOR CASTING AND SINTERING GREEN GARNET THIN FILMS, which was filed Jul. 21, 2015, the contents of each of which are herein incorporated by reference in their entirety for all purposes

FIELD

The present disclosure concerns precursors to inorganic thin films (e.g., green tapes or sintered films made from green tapes), processes for using these precursors to make sintered thin films, and sintered thin films made by the processes set forth herein. In some examples, the sintered thin films made by the processes set forth herein are useful as solid electrolytes in rechargeable batteries. In many examples, the green tapes which are set forth herein and used to make sintered thin films have a higher solid loading than known green tapes. The sintered thin films prepared by the processes herein have a lower porosity, a higher density, less defects, and, or, are prepared in higher yield than known sintered thin films.

BACKGROUND

Solid state ceramics, such as lithium-stuffed garnet materials and lithium borohydrides, oxides, sulfides, oxyhalides, and halides have several advantages as materials for ion-conducting electrolyte membranes and separators in a variety of electrochemical devices including fuel cells and rechargeable batteries. When compared to their liquid-based counterparts, the aforementioned solid ceramics possess safety and economic advantages as well as advantages related to the material's solid state and density which allows for correspondingly high volumetric and gravimetric energy densities when these materials are incorporated into electrochemical devices as electrolyte separators. Solid state ion conducting ceramics are well suited for solid state electrochemical devices because of their high ion conductivity properties in the solid state, their electric insulating properties, as well as their chemical compatibility with a variety of species such as lithium metal and their stability to a wide window of voltages.

Although solid state ion conducting ceramics have a series of advantageous and beneficial properties, these materials suffer from a range of issues related to forming green films (i.e., green tapes) and to subsequently sintering these green films. When solid state ion conducting ceramics are typically formulated as thin films and sintered, these films have a tendency to stick to the substrate on which they are prepared, to crack or warp on account of the processing conditions, or are too brittle post-sintering to handle and manipulate. In particular, during sintering of thin films, these films have a tendency to crack, warp, or otherwise have surface deteriorations.

There is therefore a series of problems in the relevant field related to casting green tapes of ceramics, such as but not limited to garnets and lithium sulfides, and to sintering these green tapes to prepare high density garnet thin films. What is needed in the relevant field is, for example, new materials and processes for casting green tapes and for sintering the same. The instant disclosure sets forth such materials and processes, in addition to making and using the same, and other solutions to problems in the relevant field.

SUMMARY

In one embodiment, the instant disclosure sets forth methods for casting a thin film tape, in which the methods include, generally, providing at least one source power, modifying the at least one source powder to prepare a modified source powder, providing a slurry of the modified source powder, casting the slurry to form a green tape, drying the green tape; and sintering the green tape to form a sintered thin film.

In a second embodiment, the instant disclosure sets forth a slurry for casting a green tape, in which the slurry includes a source powder, optionally precursors to the source powder, and at least one member selected from binders, dispersants, and solvents.

In a third embodiment, the instant disclosure sets forth a method for sintering a green tape, the method including: (a) providing at least one source powder; (b) modifying the at least one source powder to prepare a modified source powder; (c) providing a slurry of the modified source powder; (d) casting the slurry to form a green tape; (e) drying the green tape; and (f) sintering the green tape; thereby sintering a green tape.

In a fourth embodiment, the instant disclosure sets forth a slurry for preparing a cast green film, the slurry including:
at least two or more of:
a solvent selected from the group consisting of methanol, ethanol, MEK, isopropanol, acetone, cyclohexanone, toluene, acetic acid, and benzene;
a binder selected from the group consisting of fish oil, PVB, KD1, an acrylic acid, triton, phosphate esters, and derivatives thereof;
a plasticizer selected from the group consisting of a benzyl butyl phthalate or di-butyl phthalate;
a pH modifier;
a sintering aid selected from the group consisting; and
a source powder selected from a lithium-stuffed garnet In a fifth embodiment, the instant disclosure sets forth a green tape, including:
a source powder;
a solvent;
a binder; and
a dispersant;
wherein the green tape has a pycnometry density greater than 3.9 and less than 5.0.

In a sixth embodiment, the instant disclosure sets forth a method of making a green tape, including the following steps: (a) providing a slurry; (b) providing a binder mixture; (c) mixing the slurry with the binder mixture to form a mixed slurry; and (d) casting the mixed slurry to provide a green tape, wherein the green tape has a total organic content of about 10-25% w/w.

BRIEF DESCRIPTIONS OF THE DRAWINGS

FIG. 1 shows an example flow chart in accordance with an embodiment of the methods set forth herein.

FIG. 2 shows a scanning electron microscopy (SEM) image of a green tape made by the casting methods set forth in Example 1. The tape include 15% binder, the garnet had a $d_{50}$ of about 180 nm, and a density of 2.3 g/cm³. The organic portion is labeled 201, and the inorganic portion is labeled 202.

Figure 1:
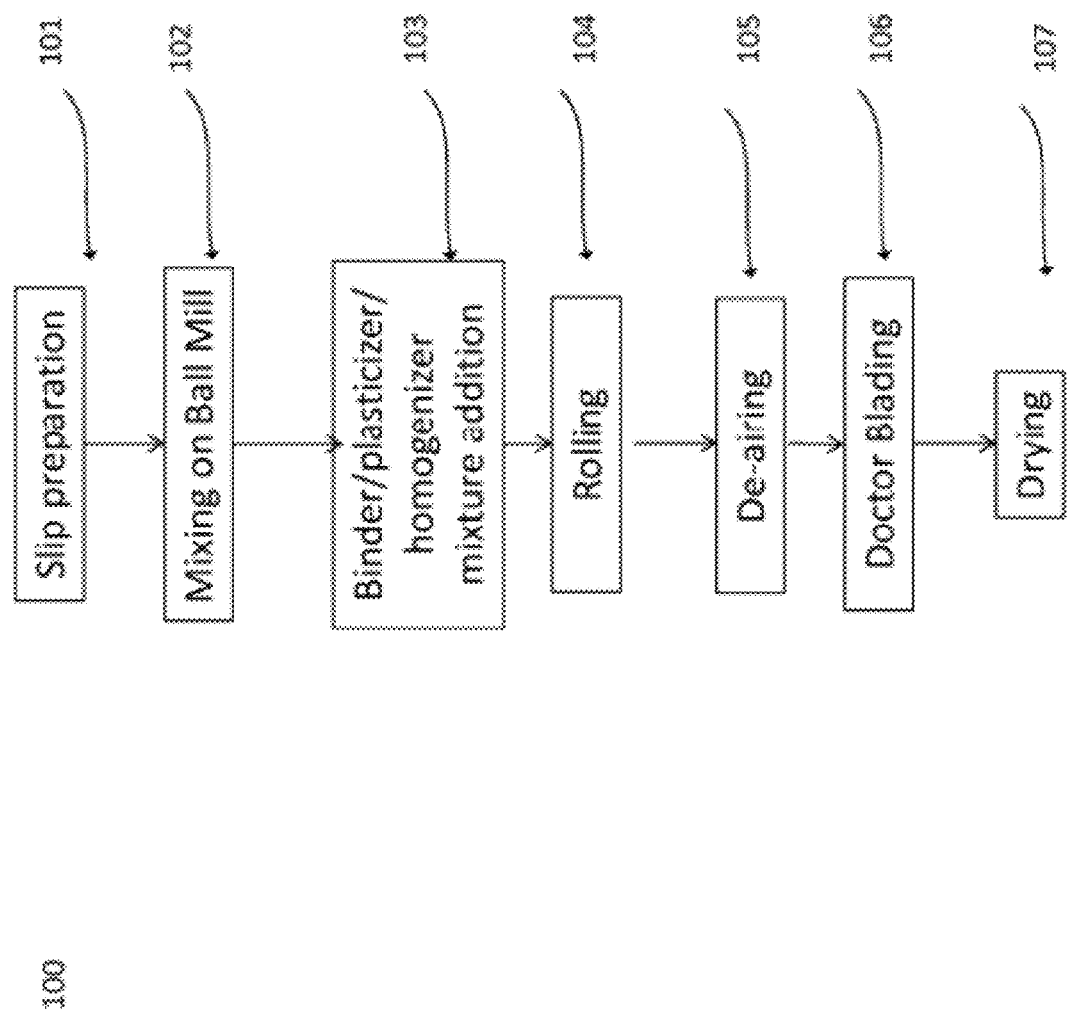

The figures depict various embodiments of the present disclosure for purposes of illustration only. One skilled in the art will readily recognize from the following discussion that alternative embodiments of the structures and methods illustrated herein may be employed without departing from the principles described herein.

The following description is presented to enable one of ordinary skill in the art to make and use the disclosed subject matter and to incorporate it in the context of particular applications. Various modifications, as well as a variety of uses in different applications will be readily apparent to those skilled in the art, and the general principles defined herein may be applied to a wide range of embodiments. Thus, the present disclosure is not intended to be limited to the embodiments presented, but is to be accorded the widest scope consistent with the principles and novel features disclosed herein.

In the following detailed description, numerous specific details are set forth in order to provide a more thorough understanding of the present disclosure. However, it will be apparent to one skilled in the art that the present disclosure may be practiced without necessarily being limited to these specific details. In other instances, well-known structures and devices are shown in block diagram form, rather than in detail, in order to avoid obscuring the present disclosure.

DETAILED DESCRIPTION

The disclose herein sets forth green tapes, processes for making these tapes, and processes for sintering these tapes. The processes herein produce sintered thin films having improved surface qualities when compared with films prepared by conventionally known methods. Some of the films prepared by the methods described herein are prepared with uniformly rough (i.e., smooth) surfaces. These films have a surface, as sintered, which is suitable for incorporation into an electrochemical device without further processing, such as polishing or lapping. Depending on the particular application, it may be necessary to process the sintered films prepared herein by polishing or lapping, but for other applications the films, as sintered by the methods set forth herein, are suitable for electrochemical device applications. In some examples, the films prepared herein have a surface roughness less than 5 μm post-sintering.

A. DEFINITIONS

As used herein, "providing" refers to the provision of, generation or, presentation of, or delivery of that which is provided. Providing includes making something available. For example, providing a power refers to the process of making the powder available, or delivering the powder, such that the powder can be used as set forth in a method described herein. As used herein, providing also means measuring, weighing, transferring combining, or formulating.

As used herein, "casting" means to provide, deposit, or deliver a cast solution or slurry onto a substrate. Casting includes, but is not limited to, slot casting, dip coating, and doctor blading. As used herein, the phrase "slot casting," refers to a deposition process whereby a substrate is coated, or deposited, with a solution, liquid, slurry, or the like by flowing the solution, liquid, slurry, or the like, through a slot or mold of fixed dimensions that is placed adjacent to, in contact with, or onto the substrate onto which the deposition or coating occurs. In some examples, slot casting includes a slot opening of about 1 to 100 μm. As used herein, the phrase "dip casting" or "dip coating" refers to a deposition process whereby substrate is coated, or deposited, with a solution, liquid, slurry, or the like, by moving the substrate into and out of the solution, liquid, slurry, or the like, often in a vertical fashion. As used herein, "casting a slurry" refers to a process wherein a slurry is deposited onto, or adhered to, a substrate. Casting can include, but is not limited to, slot casting and dip casting. As used herein, the phrase "slot casting," refers to a deposition process whereby a substrate is coated, or deposited, with a solution, liquid, slurry, or the like by flowing the solution, liquid, slurry, or the like, through a slot or mold of fixed dimensions that is placed adjacent to, in contact with, or onto the substrate onto which the deposition or coating occurs. In some examples, slot casting includes a slot opening of about 1 to 100 μm. As used herein, the phrase "dip casting" or "dip coating" refers to a deposition process whereby substrate is coated, or deposited, with a solution, liquid, slurry, or the like, by moving the substrate into and out of the solution, liquid, slurry, or the like, often in a vertical fashion. As used herein, casting also includes depositing, coating, or spreading a cast solution or cast slurry onto a substrate. As used herein the phrase "casting a film," refers to the process of delivering or transferring a liquid or a slurry into a mold, or onto a substrate, such that the liquid or the slurry forms, or is formed into, a film. Casting may be done via doctor blade, meyer rod, comma coater, gravure coater, microgravure, reverse comma coater, slot dye, slip and/or tape casting, and other methods known to those skilled in the art.

As used herein the phrase "casting a film," refers to the process of delivering or transferring a liquid or a slurry into a mold, or onto a substrate, such that the liquid or the slurry forms, or is formed into, a film. Casting may be done via doctor blade, Meyer rod, comma coater, gravure coater, microgravure, reverse comma coater, slot dye, slip and/or tape casting, and other methods known to those skilled in the art.

As used herein, the phrase "slot casting," refers to a deposition process whereby a substrate is coated, or deposited, with a solution, liquid, slurry, or the like by flowing the solution, liquid, slurry, or the like, through a slot or mold of fixed dimensions that is placed adjacent to, in contact with, or onto the substrate onto which the deposition or coating occurs. In some examples, slot casting includes a slot opening of about 1 to 100 μm.

As used herein, the phrase "dip casting" or "dip coating" refers to a deposition process whereby substrate is coated, or deposited, with a solution, liquid, slurry, or the like, by moving the substrate into and out of the solution, liquid, slurry, or the like, often in a vertical fashion.

As used herein, the term "laminating" refers to the process of sequentially depositing a layer of one precursor specie, e.g., a lithium precursor specie, onto a deposition substrate and then subsequently depositing an additional layer onto an already deposited layer using a second precursor specie, e.g., a transition metal precursor specie. This laminating process can be repeated to build up several layers of deposited vapor phases. As used herein, the term "laminating" also refers to the process whereby a layer comprising an electrode, e.g., positive electrode or cathode active material comprising layer, is contacted to a layer comprising another material, e.g., garnet electrolyte. The laminating process may include a reaction or use of a binder which adheres or physically maintains the contact between the layers which are laminated. Laminating also refers to the process of bringing together unsintered, i.e. "green" ceramic films.

As used herein, the phrase "green tape" or "green film" refers to an unsintered film including at least one member selected from garnet materials, precursors to garnet materials, binder, solvent, carbon, dispersant, or combinations thereof.

As used herein, the phrase "film thickness" refers to the distance, or median measured distance, between the top and bottom faces of a film. As used herein, the top and bottom faces refer to the sides of the film having the largest surface area.

As used herein, the phrases "garnet precursor chemicals," "chemical precursor to a Garnet-type electrolyte," or "garnet chemical precursors" refers to chemicals which react to form a lithium stuffed garnet material described herein. These chemical precursors include, but are not limited to, lithium hydroxide (e.g., LiOH), lithium oxide (e.g., $Li_2O$), lithium carbonate (e.g., $LiCO_3$), zirconium oxide (e.g., $ZrO_2$), lanthanum oxide (e.g., $La_2O_3$), aluminum oxide (e.g., $Al_2O_3$), aluminum (e.g., Al), aluminum nitrate (e.g., $AlNO_3$), aluminum nitrate nonahydrate, aluminum (oxy) hydroxide (gibbsite and boehmite), gallium oxide, niobium oxide (e.g., $Nb_2O_5$), and tantalum oxide (e.g., $Ta_2O_5$).

As used herein, the phrase "subscripts and molar coefficients in the empirical formulas are based on the quantities of raw materials initially batched to make the described examples" means the subscripts, (e.g., 7, 3, 2, 12 in $Li_7La_3Zr_2O_{12}$ and the coefficient 0.35 in $0.35Al_2O_3$) refer to the respective elemental ratios in the chemical precursors (e.g., LiOH, $La_2O_3$, $ZrO_2$, $Al_2O_3$) used to prepare a given material, (e.g., $Li_7La_3Zr_2O_{12} \cdot 0.35Al_2O_3$). As used here, the phrase "characterized by the formula," refers to a molar ratio of constituent atoms either as batched during the process for making that characterized material or as empirically determined.

As used herein the term "solvent," refers to a liquid that is suitable for dissolving or solvating a component or material described herein. For example, a solvent includes a liquid, e.g., toluene, which is suitable for dissolving a component, e.g., the binder, used in the garnet sintering process.

As used herein the phrase "removing a solvent," refers to the process whereby a solvent is extracted or separated from the components or materials set forth herein. Removing a solvent includes, but is not limited to, evaporating a solvent. Removing a solvent includes, but is not limited to, using a vacuum or a reduced pressure to drive off a solvent from a mixture, e.g., an unsintered thin film. In some examples, a thin film that includes a binder and a solvent is heated or also optionally placed in a vacuum or reduced atmosphere environment in order to evaporate the solvent to leave the binder, which was solvated, in the thin film after the solvent is removed.

As used herein, "thin" means, when qualifying a film, membrane, or the like, a dimension less than 200 μm, more preferably less than 100 μm and in some cases between 0.1 and 60 μm.

As used herein, "film tape" refers to a roll or continuous layer of casted tape, either dry or not dry, which is sintered or can be sintered.

As used herein, a "binder" refers to a material that assists in the adhesion of another material. For example, as used herein, polyvinyl butyral is a binder because it is useful for adhering garnet materials. Other binders include polycarbonates. Other binders may include polymethylmethacrylates. These examples of binders are not limiting as to the entire scope of binders contemplated here but merely serve as examples. Binders useful in the present disclosure include, but are not limited to, polypropylene (PP), atactic polypropylene (aPP), isotactive polypropylene (iPP), ethylene propylene rubber (EPR), ethylene pentene copolymer (EPC), polyisobutylene (PIB), styrene butadiene rubber (SBR), polyolefins, polyethylene-co-poly-1-octene (PE-co-PO), PE-co-poly(methylene cyclopentane) (PE-co-PMCP), poly methyl-methacrylate (and other acrylics), acrylic, polyvinylacetacetal resin, polyvinylbutyral resin, PVB, polyvinyl acetal resin, stereoblock polypropylenes, polypropylene polymethylpentene copolymer, polyethylene oxide (PEO), PEO block copolymers, silicone, and the like.

As used here, the phrase "lithium-stuffed garnet electrolyte," refers to oxides that are characterized by a crystal structure related to a garnet crystal structure. Lithium-stuffed garnets include compounds having the formula $Li_AL-a_BM'_cM''_DZr_EO_F$, $Li_4La_BM'_cM''_DTa_EO_F$, or $Li_4L-a_BM'_cM''_DNb_EO_F$, wherein 4<A<8.5, 1.5<B<4, 0≤C≤2, 0≤D≤2; 0≤E<2, 10<F<13, and M' and M" are each, independently in each instance selected from Al, Mo, W, Nb, Sb, Ca, Ba, Sr, Ce, Hf, Rb, or Ta, or $Li_aLa_bZr_cAl_dMe''_eO_f$, wherein 5<a<7.7; 2<b<4; 0<c≤2.5; 0≤d<2; 0≤e<2, 10<f<13 and Me" is a metal selected from Nb, Ta, V, W, Mo, Ga, or Sb and as described herein. Garnets, as used herein, also include those garnets described above that are doped with $Al_2O_3$. Garnets, as used herein, also include those garnets described above that are doped so that $Al^{3+}$ substitutes for $Li^+$. As used herein, lithium-stuffed garnets, and garnets, generally, include, but are not limited to, $Li_{7.0}La_3(Zr_{t1}+Nb_{t2}+Ta_{t3})O_{12}+0.35Al_2O_3$; wherein (t1+t2+t3=subscript 2) so that the La:(Zr/Nb/Ta) ratio is 3:2. Also, garnet used herein includes, but is not limited to, $Li_xLa_3Zr_2O_{12}+yAl_2O_3$, wherein x ranges from 5.5 to 9; and y ranges from 0 to 1. In some examples x is 6-7 and y is 1.0. In some examples x is 7 and y is 0.35. In some examples x is 6-7 and y is 0.7. In some examples x is 6-7 and y is 0.4. Also, garnets as used herein include, but are not limited to, $Li_xLa_3Zr_2O_{12}+yAl_2O_3$. Non-limiting example lithium-stuffed garnet electrolytes are found, for example, in US Patent Application Publication No. 2015-0200420 A1, which published Jul. 16, 2015.

As used herein, garnet does not include YAG-garnets (i.e., yttrium aluminum garnets, or, e.g., $Y_3Al_5O_{12}$). As used herein, garnet does not include silicate-based garnets such as pyrope, almandine, spessartine, grossular, hessonite, or cinnamon-stone, tsavorite, uvarovite and andradite and the solid solutions pyrope-almandine-spessarite and uvarovite-grossular-andradite. Garnets herein do not include nesosilicates having the general formula $X_3Y_2(SiO_4)_3$ wherein X is Ca, Mg, Fe, and, or, Mn; and Y is Al, Fe, and, or, Cr.

As used herein the phrase "garnet-type electrolyte," refers to an electrolyte that includes a lithium stuffed garnet material described herein as the ionic conductor. The advantages of Li-stuffed, garnet solid state electrolytes are many, including as a substitution for liquid, flammable electrolytes commonly used in lithium rechargeable batteries.

As used herein, the phrase "$d_{50}$ diameter" refers to the median size, in a distribution of sizes, measured by microscopy techniques or other particle size analysis techniques, such as, but not limited to, scanning electron microscopy or dynamic light scattering. $D_{50}$ includes the characteristic dimension at which 50% of the particles are smaller than the recited size.

As used herein, the phrase "$d_{90}$ diameter" refers to the median size, in a distribution of sizes, measured by microscopy techniques or other particle size analysis techniques, such as, but not limited to, scanning electron microscopy or dynamic light scattering. $D_{90}$ includes the characteristic dimension at which 90% of the particles are smaller than the recited size.

As used herein, a "thickness" by which is film is characterized refers to the distance, or median measured distance, between the top and bottom faces of a film. As used herein, the top and bottom faces refer to the sides of the film having the largest surface area.

As used herein, the phrase "subscripts and molar coefficients in the empirical formulas are based on the quantities of raw materials initially batched to make the described examples" means the subscripts, (e.g., 7, 3, 2, 12 in $Li_7La_3Zr_2O_{12}$ and the coefficient 0.35 in $0.35Al_2O_3$) refer to the respective elemental ratios in the chemical precursors (e.g., LiOH, $La_2O_3$, $ZrO_2$, $Al_2O_3$) used to prepare a given material, (e.g., $Li_7La_3ZrO_{12}\cdot 0.35Al_2O_3$).

As used herein the phrase "sintering the film," refers to a process whereby a thin film, as described herein, is densified (made denser, or made with a reduced porosity) through the use of heat sintering or field assisted sintering. Sintering includes the process of forming a solid mass of material by heat and/or pressure without melting it to the point of complete liquification.

As used herein, the term "plasticizer" refers to an additive that imparts either flexibility or plasticity to the green tape. It may be a substance or material used to increase the binder's flexibility, workability, or distensibility. Flexibility is the ability to bend without breaking. Plasticity is the ability to permanently deform.

As used herein, the phrase "stress relieving," refers to a process which eliminates residual stress in a casted green tape during drying and associated shrinkage. One method of stress relieving includes heating the green tape at a temperature above the glass transition temperature of the organic components in the green tape to allow structural and stress rearrangement in the casted green tape to eliminate residual stress. Another method of stress relieving includes heating a casted green tape to 70° C. and holding at that temperature for a minute to allow casted green tape to relieve stress.

As used herein, the phrase "pH modifier," refers to an acid or a base that can be added to a slurry to adjust the acidity or basicity of the slurry in order to achieve better dispersion stability of cast slurry. pH modifiers include, but are not limited to, citric acid and ammonia hydroxide, as well as other equivalent pH modifiers.

As used herein, the phrase "as batched," refers to the respective molar amounts of components as initially mixed or provided at the beginning of a synthesis. For example, the formula $Li_7La_3Zr_2O_{12}$, as batched, means that the ratio of Li to La to Zr to O in the reagents used to make $Li_7La_3Zr_2O_{12}$ was 7 to 3 to 2 to 12.

As used herein, a pycnometry density is measured using a Micromeritics AccuPycII 1340 Calibrate instrument. Using this instrument, a controlled amount of a powder sample is placed in a cup and its mass measured. The instrument is used to measure volume and calculate density by mass/volume.

As used herein, the phrase "sintering aid," refers to an additive that is used to either form lower the melting point of a liquid phase or that allows for faster sintering than otherwise would be possible without the sintering add. Sintering aids assist in the diffusion/kinetics of atoms being sintered. For example, $LiAlO_2$ may be used as an additive in a slurry having garnet since the $LiAlO_2$ can form a liquid with the garnet at between about 1050 and 1100° C., which provides for faster densification of garnet during sintering.

As used herein, a particle size distribution (hereinafter "PSD") is measured by light scattering, for example, using on a Horiba LA-950 V2 particle size analyzer in which the solvents used for the analysis include toluene, IPA, or acetonitrile and the analysis includes a one-minute sonication before measurement.

As used herein, the phrase "source powder" refers to an inorganic material used in a slurry set forth herein. In some examples, the source powder is a lithium-stuffed garnet. For example, the source powder may include a powder of $Li_7La_3Zr_2O_{12}\cdot 0.5Al_2O_3$.

As used herein, the phrase "phosphate ester," refers to, for example, phosphate esters known as Hypermer KD-23™, Hypermer KD-24™, Phoschem PD™, Phoschem R-6™, Phospholan PS-131™, and Rhodoline 4188™.

As used herein, the term "DBP" refers to the chemical having the formula $C_{16}H_{22}O_4$, Dibutyl phthalate, having a Molecular weight of 278.35 g/mol.

As used herein, the term "BBP," refers to benzyl butyl phthalate, $C_{19}H_{20}O_4$, and having a Molecular weight of 312.37 g/mol.

As used herein, the term "PEG," refers to polyethylene glycol. Unless otherwise specified, the molecular weight of the PEG is from 400 to 6000 g/mol.

B. GREEN TAPES

In some examples set forth herein, the green tapes casted by the methods set forth herein contain refractory and, or, ceramic materials that are formulated as ceramic particles intimately mixed with a binder. The purpose of this binder is, in part, to assist the sintering of the ceramic particles to result in a uniform and thin film, or layer, of refractory or ceramic post-sintering. During the sintering process, the binder burns (e.g., calcination) out of the sintering thin film. In some examples, this binder burns out of the sintering film at a temperature less than 700° C., less than 450° C., less than 400° C., less than 350° C., less than 300° C., less than 250° C., or in some examples less than 200° C., or in some examples less than 150° C., or in some examples less than 100° C. During the binder removal, the oxygen and water partial pressures may be controlled.

C. METHOD OF MAKING

The composites set forth herein can be made by a variety of methods. In some methods a slurry containing a source powder is prepared, this slurry is cast onto a substrate or a setter plate, and then this slurry is dried and sintered to prepare a dried and sintered solid ion conducting ceramic. In certain examples, the substrate may include, for example, Mylar, silicone coated Mylar, surfaces coated with polymers, surface modified polymers, or surface assembled monolayers adhered, attached, or bonded to a surface.

In one example, the methods set forth herein are substantially as set forth in FIG. 1. In FIG. 1, Method 100 is described. In this method, the first step includes slip preparation 101. This entails combining a solvent, dispersant, and a source powder such as garnet into a reaction container (e.g., a 50 ml Nalgene bottle). Milling media is also added.

In step 102, the combined contents are milled for 1 hour to 3 days. In the third step 103, the binder, plasticizer, and or, homogenizers are added to the reaction container to form a slurry. In the fourth step 104, the slurry is rolled by rolling the reaction container to blend the binder. In the fifth step 105, the slurry is de-aired by a de-airing process to remove gas. In the sixth step 106, the slurry is cast by a doctor blade cast method onto a substrate (e.g., silicone coated Mylar). In the seventh step 107, the cast film is dried. In this step 107, the drying is accomplished in a controlled fashion to avoid cracking or defect formation in the film. In one example, the slurry included 70 g of garnet powder that had a $d_{50}$ of approximately 3 μm, 16 g of MEK solvent, 1.4 g of phosphate ester, 8.4 g of poly methyl methacrylate binder in 50% by weight (w/w) MEK, 3.5 g of a plasticizer (e.g., S-160), and 1.6 g of cyclohexanone.

D. SLURRY

In some examples, the binders suitable for use with the slurries described herein include binders, used to facilitate the adhesion between the Li-stuffed garnet particles, include, but are not limited to, polypropylene (PP), polyvinyl butyral (PVB), poly ethyl methacrylate (PEMA), polyvinyl pyrrolidone (PVP), atactic polypropylene (aPP), isotactive polypropylene ethylene propylene rubber (EPR), ethylene pentene copolymer (EPC), polyisobutylene (PIB), styrene butadiene rubber (SBR), polyolefins, polyethylene-copoly-1-octene (PE-co-PO); PE-co-poly(methylene cyclopentane) (PE-co-PMCP); stereo block polypropylenes, polypropylene polymethylpentene copolymer, poly propylene carbonate, methyl methacrylate (or PMMA), ethyl methacrylate (or PEMA), and silicone. Other binders include binder is selected polypropylene (PP), atactic polypropylene (aPP), isotactic polypropylene (iPP), ethylene propylene rubber (EPR), ethylene pentene copolymer (EPC), polyisobutylene (PIB), styrene butadiene (SBR), polyolefins, polyethylene-co-poly-1-octene (PE-co-PO), PE-co-poly(methylene cyclopentene) (PE-co-PMCP), stereoblock polypropylenes, polypropylene polymethyl pentene, polyethylene oxide (PEO), PEO block copolymers, silicone, and combinations thereof.

Examples of dispersants, include, but are not limited to, phosphate esters, esters such as fish oil, surfactants, fluoro-surfactants, polyvinylpyridine (PVP), polyvinyl butadiene (PVB), polyalkylene amine, acrylic polymers.

In some examples, the slurry may also include a surfactant. A non-limiting list of suitable surfactants includes cetylpyridinium chloride, cetylpyridium bromide, and sodium dodecylbenzenesulfonate.

In some examples, the slurry may also include a pH modifier. Example pH modifiers include, but are not limited to, glacial acetic acid, $NH_4OH$, monoethanol amine, NaOH, $Na_2CO_3$, and KOH.

In some examples, the slurry may also include a plasticizer. Example plasticizers include, but are not limited to, dibutyl phthalate, dioctyl phthalate, and benzyl butyl phthalate.

In some examples, the slurry includes Li garnet powders or precursors that strongly interact with solvents or organic binders and which increase slurry viscosity via re-flocculation. In some examples, the re-flocculation is at a high level that does not result in high quality slurries and casted tapes. In these particular examples, the process can be controlled by the addition of an agent which changes the pH of the slurry so that it has a stable dispersion in the slurry. In these particular examples, the process can also controlled by the addition of less reactive solvents and, or, binders. In these examples, the slurries have good dispersion, low viscosity and minimal organic content.

E. CASTING

Some tape casting methods are known in the relevant filed and include those set forth in Mistler, R. E. and Twiname, E. R, *Tape Casting: Theory and Practice*, $1^{st}$ Edition Wiley-American Ceramic Society; 1 edition (Dec. 1, 2000), the entire contents of which is herein incorporated by reference in its entirety for all purposes. Other casting methods and materials as set forth in U.S. Pat. No. 5,256,609, to Dolhert, L. E., and entitled CLEAN BURNING GREEN TAPE CAST SYSTEM USING ATACTIC POLYPROPYLENE BINDER), the entire contents of which is herein incorporated by reference in its entirety for all purposes.

In some methods set forth herein, the methods include casting a tape of ceramic source powder onto a substrate (e.g., porous or nonporous alumina, zirconia, garnet, alumina-zirconia, lanthanum alumina-zirconia). In some examples, the tape is prepared on a substrate such as a silicone coated substrate (e.g., silicone coated Mylar, or silicone coated Mylar on alumina).

In some methods set forth herein, the sintering films release volatile components. These components can often result in cracking or surface deterioration in the sintering film unless setter plates are used which allow for these volatile components to evaporate or volatilize away from the sintering film. In some particular examples, it is advantageous to use a porous setter plate to assist with the evaporation of these volatile components.

F. TAPE DRYING AFTER CASTING

In some examples, the methods set forth herein include drying a casted tape (e.g., a green film). In some methods, drying includes controlling the temperature of the casted tape by, for example, using a heated bed on which to place or deposit the casted film, infrared (IR) heating, or convection heating of the casted tape. In some methods, drying may include using environmental controls such as, but not limited to, stagnant and, or, flowing environment (e.g., atmospheric air, dry air, inert gas, nitrogen gas, argon gas) to manage or to control the amount of solvent in the drying ambient. In these methods, the drying is used to control the rate of solvent removal and to ensure that the cast film dries from the substrate to the surface as opposed to from the surface to the substrate.

In some examples, prior to drying the cast green tape, the cast green tape includes a solvent which is an azeotrope. In some examples, this azeotrope is a solvent comprises cyclohexanone at 10-25 weight % of the green tape. In some examples, the weight percent of cyclohexanone in the azeotrope is 10 weight %. In some examples, the weight percent of cyclohexanone in the azeotrope is 11 weight %. In some examples, the weight percent of cyclohexanone in the azeotrope is 12 weight %. In some examples, the weight percent of cyclohexanone in the azeotrope is 13 weight %. In some examples, the weight percent of cyclohexanone in the azeotrope is 14 weight %. In some examples, the weight percent of cyclohexanone in the azeotrope is 15 weight %. In some examples, the weight percent of cyclohexanone in the azeotrope is 16 weight %. In some examples, the weight percent of cyclohexanone in the azeotrope is 17 weight %. In some examples, the weight percent of cyclohexanone in the azeotrope is 18 weight %. In some examples, the weight percent of cyclohexanone in the azeotrope is 19 weight %. In some examples, the weight percent of cyclohexanone in the azeotrope is 20 weight %. In some examples, the weight percent of cyclohexanone in the azeotrope is 21 weight %. In some examples, the weight percent of cyclohexanone in the azeotrope is 22 weight %. In some examples, the weight percent of cyclohexanone in the azeotrope is 23 weight %. In some examples, the weight percent of cyclohexanone in the azeotrope is 24 weight %. In some examples, the weight percent of cyclohexanone in the azeotrope is 25 weight %. In some examples, the solvent is a combination of MEK:IPA. In certain examples, the ratio of MEK:IPA is 1:1. In certain examples, the ratio of MEK:IPA is 2:1. In certain examples, the ratio of MEK:IPA is 3:1. In certain examples, the ratio of MEK:IPA is 4:1. In certain examples, the ratio of MEK:IPA is 5:1. In certain examples, the ratio of MEK:IPA is 5:1. n certain examples, the ratio of MEK:IPA is 7:1. In certain examples, the ratio of MEK:IPA is 8:1. In certain examples, the ratio of MEK:IPA is 5:1. In certain examples, the ratio of MEK:IPA is 5:2. In certain examples, the ratio of MEK:IPA is 6:2. In certain examples, the ratio of MEK:IPA is 7:2. In certain examples, the ratio of MEK:IPA is 8:2. In certain examples, the ratio of MEK:IPA is 9:2. In certain examples, the ratio of MEK:IPA is 10:3. In certain examples, the ratio of MEK:IPA is 11:3. In certain examples, the ratio of MEK:IPA is 5:3. In certain examples, the ratio of MEK:IPA is 6:3. In certain examples, the ratio of MEK:IPA is 7:3. In certain examples, the ratio of MEK:IPA is 8:3. In certain examples, the ratio of MEK:IPA is 9:3. In certain examples, the ratio of MEK:IPA is 10:3. In certain examples, the ratio of MEK:IPA is 11:3.

In some examples, after the green tape is dried, the total amount of material other than the source powder is about 10-25% by weight of the green tape. In some examples the total amount of material other than the source powder is 10% by weight of the green tape. In some examples the total amount of material other than the source powder is 11% by weight of the green tape. In some examples the total amount of material other than the source powder is 12% by weight of the green tape. In some examples the total amount of material other than the source powder is 13% by weight of the green tape. In some examples the total amount of material other than the source powder is 14% by weight of the green tape. In some examples the total amount of material other than the source powder is 15% by weight of the green tape. In some examples the total amount of material other than the source powder is 16% by weight of the green tape. In some examples the total amount of material other than the source powder is 17% by weight of the green tape. In some examples the total amount of material other than the source powder is 18% by weight of the green tape. In some examples the total amount of material other than the source powder is 19% by weight of the green tape. In some examples the total amount of material other than the source powder is 20% by weight of the green tape. In some examples the total amount of material other than the source powder is 21% by weight of the green tape. In some examples the total amount of material other than the source powder is 22% by weight of the green tape. In some examples the total amount of material other than the source powder is 23% by weight of the green tape. In some examples the total amount of material other than the source powder is 24% by weight of the green tape. In some examples the total amount of material other than the source powder is 25% by weight of the green tape. In some of these examples, the amount of source powder is 60, 65, 70, 75, or 80% be weight fo the green tape.

G. SETTER PLATES

In the methods described herein, the setter plates and the sintering methods set forth in International PCT Patent Applications Nos. PCT/US16/27886, filed on Apr. 15, 2016, and PCT/US16/27922, filed on Apr. 15, 2016, the content of both patent applications is incorporated herein by reference in its entirety for all purposes.

In some examples, the green films prepared by the methods herein, and those incorporated by reference, are sintered between setter plates. In some examples, these setter plates are composed of a metal, an oxide, a nitride, a metal, oxide or nitride with an organic or silicone laminate layer thereupon. In certain examples, the setter plates are selected from the group consisting of platinum (Pt) setter plates, palladium (Pd) setter plates, gold (Au) setter plates, copper (Cu) setter plates, aluminum (Al) setter plates, alumina setter plates, porous alumina setter plates, steel setter plates, zirconium (Zr) setter plates, zirconia setter plates, porous zirconia setter plates, lithium oxide setter plates, porous lithium oxide setter plates, lanthanum oxide setter plates, porous lanthanum oxide setter plates, garnet setter plates, porous garnet setter plates, lithium-stuffed garnet setter plates, porous lithium-stuffed garnet setter plates, and combinations thereof. In some examples, the setter plates are garnet setter plates or porous garnet setter plates.

In some examples, the green films prepared by the methods herein, and those incorporated by reference, are sintered on at least one setter plate. In some examples, these setter plates are composed of a metal, an oxide, a nitride, a metal, oxide or nitride with an organic or silicone laminate layer thereupon. In certain examples, the setter plates are selected from the group consisting of platinum (Pt) setter plates, palladium (Pd) setter plates, gold (Au) setter plates, copper (Cu) setter plates, aluminum (Al) setter plates, alumina setter plates, porous alumina setter plates, steel setter plates, zirconium (Zr) setter plates, zirconia setter plates, porous zirconia setter plates, lithium oxide setter plates, porous lithium oxide setter plates, lanthanum oxide setter plates, Lithium zirconium oxide ($Li_2ZrO_3$) setter plates, Lithium aluminum oxide ($LiAlO_2$) setter plates, porous lanthanum oxide setter plates, garnet setter plates, porous garnet setter plates, lithium-stuffed garnet setter plates, porous lithium-stuffed garnet setter plates, and combinations of the aforementioned.

In some examples, the green films prepared by the methods herein, and those incorporated by reference, are sintered between setter plates in which a metal powder is positioned between the setter plate and the green film. In some examples, these setter plates are composed of a metal, an oxide, a nitride, a metal, oxide or nitride with an organic or silicone laminate layer thereupon. In certain examples, the setter plates are selected from the group consisting of platinum (Pt) setter plates, palladium (Pd) setter plates, gold (Au) setter plates, copper (Cu) setter plates, aluminum (Al) setter plates, alumina setter plates, porous alumina setter plates, steel setter plates, zirconium (Zr) setter, zirconia setter plates, porous zirconia setter plates, lithium oxide setter plates, porous lithium oxide setter plates, lanthanum oxide setter plates, Lithium zirconium oxide ($Li_2ZrO_3$) setter plates, Lithium aluminum oxide ($LiAlO_2$) setter plates, porous lanthanum oxide setter plates, Lithium zirconium oxide ($Li_2ZrO_3$) setter plates, Lithium aluminum oxide (LiAlO$_2$) setter plates, garnet setter plates, porous garnet setter plates, lithium-stuffed garnet setter plates, and porous lithium-stuffed garnet setter plates, and combinations of the aforementioned. In these particular examples, the metal powder is selected from Ni power, Cu powder, Au powder, Fe powder, or combinations thereof.

In some examples, the green films prepared by the methods herein, and those incorporated by reference, are sintered between setter plates in which a metal layer or film is positioned between the setter plate and the green film. In some examples, these setter plates are composed of a metal, an oxide, a nitride, a metal, oxide or nitride with an organic or silicone laminate layer thereupon. In certain examples, the setter plates are selected from the group consisting of platinum (Pt) setter plates, palladium (Pd) setter plates, gold (Au) setter plates, copper (Cu) setter plates, aluminum (Al) setter plates, alumina setter plates, porous alumina setter plates, steel setter plates, zirconium (Zr), zirconia setter plates, porous zirconia setter plates, lithium oxide setter plates, porous lithium oxide setter plates, lanthanum oxide setter plates, porous lanthanum oxide setter plates, garnet setter plates, porous garnet setter plates, lithium-stuffed garnet setter plates, porous lithium-stuffed garnet setter plates, magnesia setter plates, porous magnesia setter plates. In these particular examples, the metal powder is selected from Ni power, Cu powder, Mg powder, Mn power, Au powder, Fe powder, or combinations thereof.

During certain sintering conditions, a layer of particles (e.g., a setter sheet) or powder may be placed between the green film and the setter plates to assist with the sintering of the green film. As the green film sinters, it tends to shrink and densify which if not controlled can lead to cracking or other mechanical defects in the film. In some of these examples, the layer of particles comprises a uniform layer of particles. In some other of these examples, the layer of particles comprises a uniform layer of inert, or non-reactive with the green film, particles. In some sintering conditions, the layer of particles is provided as a sheet of particles. In some examples, the thickness of the sheet or layer or particles is about equal to the size of the particles in the sheet or layer. In other examples, the inert particles positions between the green film and the setter plate(s) is positioned between the contact surfaces of the green film and the parts of the green film which are being sintered. In some continuous sintering processes, the setter plates and, or, the particles, layers, or sheets which are placed between the setter plates and the green film, may be moved or repositioned during the sintering process so that a continuous roll of sintered film is prepared in a continuous process. In these continuous processes, the setter plates and the particles, layers, or sheets, move in conjunction with the movement of the green film so that the portion of the green film being sintering is in contact with the particles, layers, or sheets which are also in contact with the setter plates. In some instances, the layers or sheets are prepared with a particular weight to prevent tape warping and surface deterioration.

In some of the examples described herein, the layer or sheet of inert and, or, uniform particles (or powders) assists the sintering process by providing a minimal amount of friction between the film and the setter plates so that the film is not strained as it sinters and reduces in volume and increases in density. By reducing the friction forces on the film, the green film can shrink with minimal stress during the sintering process. This provides for improved sintered films that do not stick to the setter plates, which do not distort during the sintering process, and which do not crack during the sintering process or thereafter.

In some examples described herein, other setter plates may be used, for example in combination with the lithium stuffed garnet setter plates described herein, so long as that other setter plate has a high melting point, a high lithium activity, and a stability in reducing environment. Some examples of these other materials include a member selected from Li$_2$ZrO$_3$, xLi$_2$O-(1−x)SiO$_2$ (where x=0.01-0.99), aLi$_2$O-bB$_2$O$_3$-cSiO$_2$ (where a+b+c=1), LiLaO$_2$, LiAlO$_2$, Li$_2$O, Li$_3$PO4, a Li-stuffed garnet, or combinations thereof. Additionally, these other setter plates should not induce a chemical potential in the sintering film which results in Li diffusion out of the sintering film and into the setter plate. Additional materials include lanthanum aluminum oxide, pyrochlore and materials having a lithium concentration of greater than 0.01 mol/cm$^3$. In some examples, the setter material may be provided as a powder or in a non-planar shape.

H. SOLVENTS

In some examples, the slurry includes a solvent selected from isopropanol, water, butanol, tetrahydrofuran (THF), optionally with a binder (e.g., PVB), and optionally with a plasticizer. In some examples, the solvent includes about 10-30% w/w isopropanol, 1-10% w/w water, 1-10% w/w butanol, and 10-30% w/w tetrahydrofuran (THF) [e.g. 100 grams garnet, 12 grams binder, 12 grams DBP, 20-30 grams solvent]. In some examples, the solvent includes about 20-30% w/w isopropanol, 3-6% w/w water, 3-6% w/w butanol, and 20-30% w/w tetrahydrofuran (THF). In some examples, the binder is 5% w/w. In some examples, the plasticizer is 5 w/w. In these examples, the garnet or calcined precursor materials represents the remaining % w/w (e.g., 40, 50, 60%, 70%, or 75 w/w). In some examples, a dispersant is used during the milling process. In some examples, the dispersant is a phosphate ester. In some examples, the plasticizer is dibutyl thalate or benzyl butyl phthalate. In some examples, the solvent is butanol and THF. In some examples, the solvent is butanol, water and THF. In some examples, the solvent is butanol, water, toluene, and THF. In some examples, the solvent is butanol and toluene. In some examples, the solvent is butanol, water and THF.

Examples of solvents include toluene, ethanol, diacetone alcohol, and combinations thereof. Other examples of solvents include combinations of isopropanol (IPA, anhydrous), butanol, and toluene. Other examples of solvents include methanol, ethanol, isopropanol, butanol, pentanol, hexanol, toluene, xylene, xylenes:butyl alcohol, cyclohexanone, tetrahydrofuran, toluene:ethanol, acetone, N-methyl-2-pyrrolidone (NMP) diacetone alcohol, ethyl acetate, acetonitrile, hexane, nonane, dodecane, methyl ethyl ketone (MEK), and combinations thereof.

In some examples, the solvent is a combination of MEK:IPA. In certain examples, the ratio of MEK:IPA is 1:1. In certain examples, the ratio of MEK:IPA is 2:1. In certain examples, the ratio of MEK:IPA is 3:1. In certain examples, the ratio of MEK:IPA is 4:1. In certain examples, the ratio of MEK:IPA is 5:1. In certain examples, the ratio of MEK:IPA is 5:1. n certain examples, the ratio of MEK:IPA is 7:1. In certain examples, the ratio of MEK:IPA is 8:1. In certain examples, the ratio of MEK:IPA is 5:1. In certain examples, the ratio of MEK:IPA is 5:2. In certain examples, the ratio of MEK:IPA is 6:2. In certain examples, the ratio of MEK:IPA is 7:2. In certain examples, the ratio of MEK:IPA is 8:2. In certain examples, the ratio of MEK:IPA is 9:2. In certain examples, the ratio of MEK:IPA is 10:3. In certain examples, the ratio of MEK:IPA is 11:3. In certain examples, the ratio of MEK:IPA is 5:3. In certain examples, the ratio of MEK:IPA is 6:3. In certain examples, the ratio of MEK:IPA is 7:3. In certain examples, the ratio of MEK:IPA is 8:3. In certain examples, the ratio of MEK:IPA is 9:3. In certain examples, the ratio of MEK:IPA is 10:3. In certain examples, the ratio of MEK:IPA is 11:3.

In of the above examples, the solvent further comprises cyclohexanone at 10-25 weight %. In some examples, the weight percent of cyclohexanone in the slurry is 10 weight %. In some examples, the weight percent of cyclohexanone in the slurry is 11 weight %. In some examples, the weight percent of cyclohexanone in the slurry is 12 weight %. In some examples, the weight percent of cyclohexanone in the slurry is 13 weight %. In some examples, the weight percent of cyclohexanone in the slurry is 14 weight %. In some examples, the weight percent of cyclohexanone in the slurry is 15 weight %. In some examples, the weight percent of cyclohexanone in the slurry is 16 weight %. In some examples, the weight percent of cyclohexanone in the slurry is 17 weight %. In some examples, the weight percent of cyclohexanone in the slurry is 18 weight %. In some examples, the weight percent of cyclohexanone in the slurry is 19 weight %. In some examples, the weight percent of cyclohexanone in the slurry is 20 weight %. In some examples, the weight percent of cyclohexanone in the slurry is 21 weight %. In some examples, the weight percent of cyclohexanone in the slurry is 22 weight %. In some examples, the weight percent of cyclohexanone in the slurry is 23 weight %. In some examples, the weight percent of cyclohexanone in the slurry is 24 weight %. In some examples, the weight percent of cyclohexanone in the slurry is 25 weight %. In some examples, the solvent is a combination of MEK:IPA. In certain examples, the ratio of MEK:IPA is 1:1. In certain examples, the ratio of MEK:IPA is 2:1. In certain examples, the ratio of MEK:IPA is 3:1. In certain examples, the ratio of MEK:IPA is 4:1. In certain examples, the ratio of MEK:IPA is 5:1. In certain examples, the ratio of MEK:IPA is 5:1. n certain examples, the ratio of MEK:IPA is 7:1. In certain examples, the ratio of MEK:IPA is 8:1. In certain examples, the ratio of MEK:IPA is 5:1. In certain examples, the ratio of MEK:IPA is 5:2. In certain examples, the ratio of MEK:IPA is 6:2. In certain examples, the ratio of MEK:IPA is 7:2. In certain examples, the ratio of MEK:IPA is 8:2. In certain examples, the ratio of MEK:IPA is 9:2. In certain examples, the ratio of MEK:IPA is 10:3. In certain examples, the ratio of MEK:IPA is 11:3. In certain examples, the ratio of MEK:IPA is 5:3. In certain examples, the ratio of MEK:IPA is 6:3. In certain examples, the ratio of MEK:IPA is 7:3. In certain examples, the ratio of MEK:IPA is 8:3. In certain examples, the ratio of MEK:IPA is 9:3. In certain examples, the ratio of MEK:IPA is 10:3. In certain examples, the ratio of MEK:IPA is 11:3.

In some examples, the solvent in the slurry includes MEK:IPA and cyclohexanone. In certain examples, the weight percent of cyclohexanone in the slurry is 10 weight %. In some examples, the weight percent of cyclohexanone in the slurry is 11 weight %. In some examples, the weight percent of cyclohexanone in the slurry is 12 weight %. In some examples, the weight percent of cyclohexanone in the slurry is 13 weight %. In some examples, the weight percent of cyclohexanone in the slurry is 14 weight %. In some examples, the weight percent of cyclohexanone in the slurry is 15 weight %. In some examples, the weight percent of cyclohexanone in the slurry is 16 weight %. In some examples, the weight percent of cyclohexanone in the slurry is 17 weight %. In some examples, the weight percent of cyclohexanone in the slurry is 18 weight %. In some examples, the weight percent of cyclohexanone in the slurry is 19 weight %. In some examples, the weight percent of cyclohexanone in the slurry is 20 weight %. In some examples, the weight percent of cyclohexanone in the slurry is 21 weight %. In some examples, the weight percent of cyclohexanone in the slurry is 22 weight %. In some examples, the weight percent of cyclohexanone in the slurry is 23 weight %. In some examples, the weight percent of cyclohexanone in the slurry is 24 weight %. In some examples, the weight percent of cyclohexanone in the slurry is 25 weight %. In some examples, the solvent is a combination of MEK:IPA. In certain examples, the ratio of MEK:IPA is 1:1. In certain examples, the ratio of MEK:IPA is 2:1. In certain examples, the ratio of MEK:IPA is 3:1. In certain examples, the ratio of MEK:IPA is 4:1. In certain examples, the ratio of MEK:IPA is 5:1. In certain examples, the ratio of MEK:IPA is 5:1. n certain examples, the ratio of MEK:IPA is 7:1. In certain examples, the ratio of MEK:IPA is 8:1. In certain examples, the ratio of MEK:IPA is 5:1. In certain examples, the ratio of MEK:IPA is 5:2. In certain examples, the ratio of MEK:IPA is 6:2. In certain examples, the ratio of MEK:IPA is 7:2. In certain examples, the ratio of MEK:IPA is 8:2. In certain examples, the ratio of MEK:IPA is 9:2. In certain examples, the ratio of MEK:IPA is 10:3. In certain examples, the ratio of MEK:IPA is 11:3. In certain examples, the ratio of MEK:IPA is 5:3. In certain examples, the ratio of MEK:IPA is 6:3. In certain examples, the ratio of MEK:IPA is 7:3. In certain examples, the ratio of MEK:IPA is 8:3. In certain examples, the ratio of MEK:IPA is 9:3. In certain examples, the ratio of MEK:IPA is 10:3. In certain examples, the ratio of MEK:IPA is 11:3.

In certain examples, the ratio of MEK:IPA is 7:3

In some examples, the solvent is a combination of MEK, IPA, and cyclohexanone.

In some examples, the solvent herein further includes water.

I. SINTERING

The green films set forth herein can be sintered by sintering methods known in the relevant field. The sintering conditions set forth in PCT/US2014/059578, Garnet Materials for Li Secondary Batteries and Methods of Making and Using Garnet Materials, filed Oct. 7, 2014, are herein incorporated by reference in their entirety for all purposes.

The green films set forth herein can be sintered in ovens open to the atmosphere. In some examples, the films are sintered in an $O_2$ rich atmosphere. In other examples, the films are sintered in an Argon rich atmosphere. In yet other examples, the films are sintered in an Argon/$H_2$ atmosphere. In other examples, the films are sintered in an Argon/$H_2O$ atmosphere. In some examples, the atmosphere used to sinter the films is not the same as the atmosphere used to cool the films after they have been sintered.

In some examples, the method includes sintering the film, wherein sintering comprises heat sintering. In some of these examples, heat sintering includes heating the film in the range from about 700° C. to about 1200° C. for about 1 to about 600 minutes and in atmosphere having an oxygen partial pressure in the range of 1e-1 atm to 1e-15 atm.

In any of the methods set forth herein, heat sintering may include heating the film in the range from about 700° C. to about 1250° C.; or about 800° C. to about 1200° C.; or about 900° C. to about 1200° C.; or about 1000° C. to about 1200° C.; or about 1100° C. to about 1200° C. In any of the methods set forth herein, heat sintering can include heating the film in the range from about 700° C. to about 1100° C.;

or about 700° C. to about 1000° C.; or about 700° C. to about 900° C.; or about 700° C. to about 800° C. In any of the methods set forth herein, heat sintering can include heating the film to about 700° C., about 750° C., about 850° C., about 800° C., about 900° C., about 950° C., about 1000° C., about 1050° C., about 1100° C., about 1150° C., or about 1200° C. In any of the methods set forth herein, heat sintering can include heating the film to 700° C., 750° C., 850° C., 800° C., 900° C., 950° C., 1000° C., 1050° C., 1100° C., 1150° C., or 1200° C. In any of the methods set forth herein, heat sintering can include heating the film to 700° C. In any of the methods set forth herein, heat sintering can include heating the film to 750° C. In any of the methods set forth herein, heat sintering can include heating the film to 850° C. In any of the methods set forth herein, heat sintering can include heating the film to 900° C. In any of the methods set forth herein, heat sintering can include heating the film to 950° C. In any of the methods set forth herein, heat sintering can include heating the film to 1000° C. In any of the methods set forth herein, heat sintering can include heating the film to 1050° C. In any of the methods set forth herein, heat sintering can include heating the film to 1100° C. In any of the methods set forth herein, heat sintering can include heating the film to 1125° C. In any of the methods set forth herein, heat sintering can include heating the film to 1150° C. In any of the methods set forth herein, heat sintering can include heating the film to 1200° C.

In any of the methods set forth herein, the methods may include heating the film for about 1 to about 600 minutes. In any of the methods set forth herein, the methods may include heating the film for about 20 to about 600 minutes. In any of the methods set forth herein, the methods may include heating the film for about 30 to about 600 minutes. In any of the methods set forth herein, the methods may include heating the film for about 40 to about 600 minutes. In any of the methods set forth herein, the methods may include heating the film for about 50 to about 600 minutes. In any of the methods set forth herein, the methods may include heating the film for about 60 to about 600 minutes. In any of the methods set forth herein, the methods may include heating the film for about 70 to about 600 minutes. In any of the methods set forth herein, the methods may include heating the film for about 80 to about 600 minutes. In any of the methods set forth herein, the methods may include heating the film for about 90 to about 600 minutes. In any of the methods set forth herein, the methods may include heating the film for about 100 to about 600 minutes. In any of the methods set forth herein, the methods may include heating the film for about 120 to about 600 minutes. In any of the methods set forth herein, the methods may include heating the film for about 140 to about 600 minutes. In any of the methods set forth herein, the methods may include heating the film for about 160 to about 600 minutes. In any of the methods set forth herein, the methods may include heating the film for about 180 to about 600 minutes. In any of the methods set forth herein, the methods may include heating the film for about 200 to about 600 minutes. In any of the methods set forth herein, the methods may include heating the film for about 300 to about 600 minutes. In any of the methods set forth herein, the methods may include heating the film for about 350 to about 600 minutes. In any of the methods set forth herein, the methods may include heating the film for about 400 to about 600 minutes. In any of the methods set forth herein, the methods may include heating the film for about 450 to about 600 minutes. In any of the methods set forth herein, the methods may include heating the film for about 500 to about 600 minutes. In any of the methods set forth herein, the methods may include heating the film for about 1 to about 500 minutes. In any of the methods set forth herein, the methods may include heating the film for about 1 to about 400 minutes. In any of the methods set forth herein, the methods may include heating the film for about 1 to about 300 minutes. In any of the methods set forth herein, the methods may include heating the film for about 1 to about 200 minutes. In any of the methods set forth herein, the methods may include heating the film for about 1 to about 100 minutes. In any of the methods set forth herein, the methods may include heating the film for about 1 to about 50 minutes.

In some examples, the sintering process may further include a filtration step.

In some examples, the sintering process may further include a de-aeration step.

In some examples, the sintering process may include sintering within a closed, but not sealed, furnace (i.e., oven, heating chamber). In some of these examples, the sintering film is placed between setter plates, optionally with setter sheets or layers therebetween as well, and the sintering film is placed next to, or in close proximity to, a sacrificial source of Li. This sacrificial source of Li helps to prevent Li loss by way of evaporation from the sintering garnet. In some examples, the closed system includes Argon gas, a mixture of Argon gas and either Hydrogen gas or water, Air, purified Air, or Nitrogen. In some of these examples, the sacrificial source of Li has a higher surface area than the surface area of the green tape which is sintered. In some examples, the Li source and the sintering green film have the same type of lithium-stuffed garnets.

J. SINTERING WITH OTHER DEVICE COMPONENTS

In certain examples, the green films are sintered while in contact with other components with which the post-sintered films would be combined if used in an electrochemical device. For example, in some examples, the green films are layered or laminated to a positive electrode composition so that after sintering the green film, the sintered film is adhered to the positive electrode. In another example, the green film is sintered while in contact with a metallic powder (e.g., nickel (Ni) powder). As the green film sinters, and the metal powder because a solid metal foil, the sintering film bonds to the metal foil. The advantage of these sintering conditions is that more than one component of an electrochemical device can be prepared in one step, thus saving manufacturing time and resources.

K. MILLING

As described herein, several recited methods include methods steps related to mixing and, or, method steps related to milling. Milling includes ball milling. Milling also includes milling methods that use inert solvents such as, but not limited to, ethanol, isopropanol, toluene, ethyl acetate, methyl acetate, acetone, acetonitrile, or combinations thereof. Depending on the material milled, the solvents may not be inert. In some of these examples, milling includes milling with solvents such as, but not limited to, ethanol, isopropanol, toluene, ethyl acetate, methyl acetate, acetone, acetonitrile, MEK, or combinations thereof.

In some examples, the milling is ball milling. In some examples, the milling is horizontal milling. In some examples, the milling is attritor milling. In some examples, the milling is immersion milling. In some examples, the milling is jet milling. In some examples, the milling is steam jet milling. In some examples, the milling is high energy milling. In some examples, the high energy milling process results in a milled particle size distribution with $d_{50}$ of approximately 100 nm. In some examples, the milling is immersion milling.

In some examples, high energy milling process is used to achieve a particle size distribution with d50 of about 100 nm. In some examples, the solvent is toluene. In some examples, the solvent is isopropyl alcohol (IPA). In some examples, the solvent is ethanol. In some examples, the solvent is diacetone alcohol. In some examples, the solvent is a polar solvents suitable for achieving the recited d50 size.

In some examples, the milling includes high energy wet milling process with 0.3 mm yttria stabilized zirconium oxide grinding media beads. In some examples, ball milling, horizontal milling, attritor milling, or immersion milling can be used. In some examples, using a high energy milling process produces a particle size distribution of about d50~100 nm to 5000 nm.

In some examples, the milling may include a classifying step such as sieving, centrifugation, or other known laboratory of separating particles of different size and/or mass.

L. EXAMPLES

SEM Electron microscopy was performed in a Helios 600i or FEI Quanta. Surface Roughness was measured by an optical microscope such as the Keyence VR that may measure height and calculate a roughness value.

Sintering instruments used included 3" laboratory tube furnace with controlled atmosphere in the partial pressure oxygen range of 1e-1 to 1e-20 atm with a custom temperature and gas flow control system

Example 1

Method for Making and Sintering a Green Tape

A first slurry was prepared which included 18.75 g of a lithium-stuffed garnet (as batched, $Li_{7.1}Zr_2La_3O_{12}+0.5Al_2O_3$) source powder mixed with 12.25 g of isopropanol, 1.875 g of polyvinylbutyral, 1.875 g of dibutyl phthalate, 2.81 g of phosphate ester, and 9 g of tetrahydrofuran.

A second slurry was prepared which included 18.75 g of a lithium-stuffed garnet source powder, mixed with 12.25 g of isopropanol, 1.875 g of polyvinylbutyral, 1.875 g of dibutyl phthalate, 2.81 g of phosphate ester, and 9 g of toluene.

A third slurry was prepared which included 18.75 g of a lithium-stuffed garnet source powder mixed with 12.25 g of a mixed solvent which included isopropanol and 20% by weight butanol, and 1.875 g of polyvinylbutyral, 1.875 g of dibutyl phthalate, and 2.81 g of phosphate ester, and 9 g of tetrahydrofuran.

A fourth slurry was prepared which included 18.75 g of a lithium-stuffed garnet source powder mixed with 12.25 g of a mixed solvent which included isopropanol and 20% by weight butanol, 1.875 g of polyvinylbutyral, 1.875 g of dibutyl phthalate, 2.81 g of phosphate ester, and 9 g of toluene.

In this example, a green tape was prepared by casting a slurry of lithium-stuffed garnet onto a substrate by doctor blading, subsequently sintering the cast slurry by placing it between two porous garnet setter plates, and then removed from the setter plates. In one example, the tape cast from the slurry was sintered at 1100° C. for 1-5 hours. In another example, the tape was sintered at 1125° C. for 1-5 hours. In another example, the tape was sintered at 1150° C. for 1-5 hours. Prior to the sintering, the binder was burned out in high pressure $O_2$ ($PO_2$) and $H_2O$. During sintering the atmosphere around the sintering film had a $PO_2$ in the range $0.5$-$10^{-20}$ atm.

Figure 2:
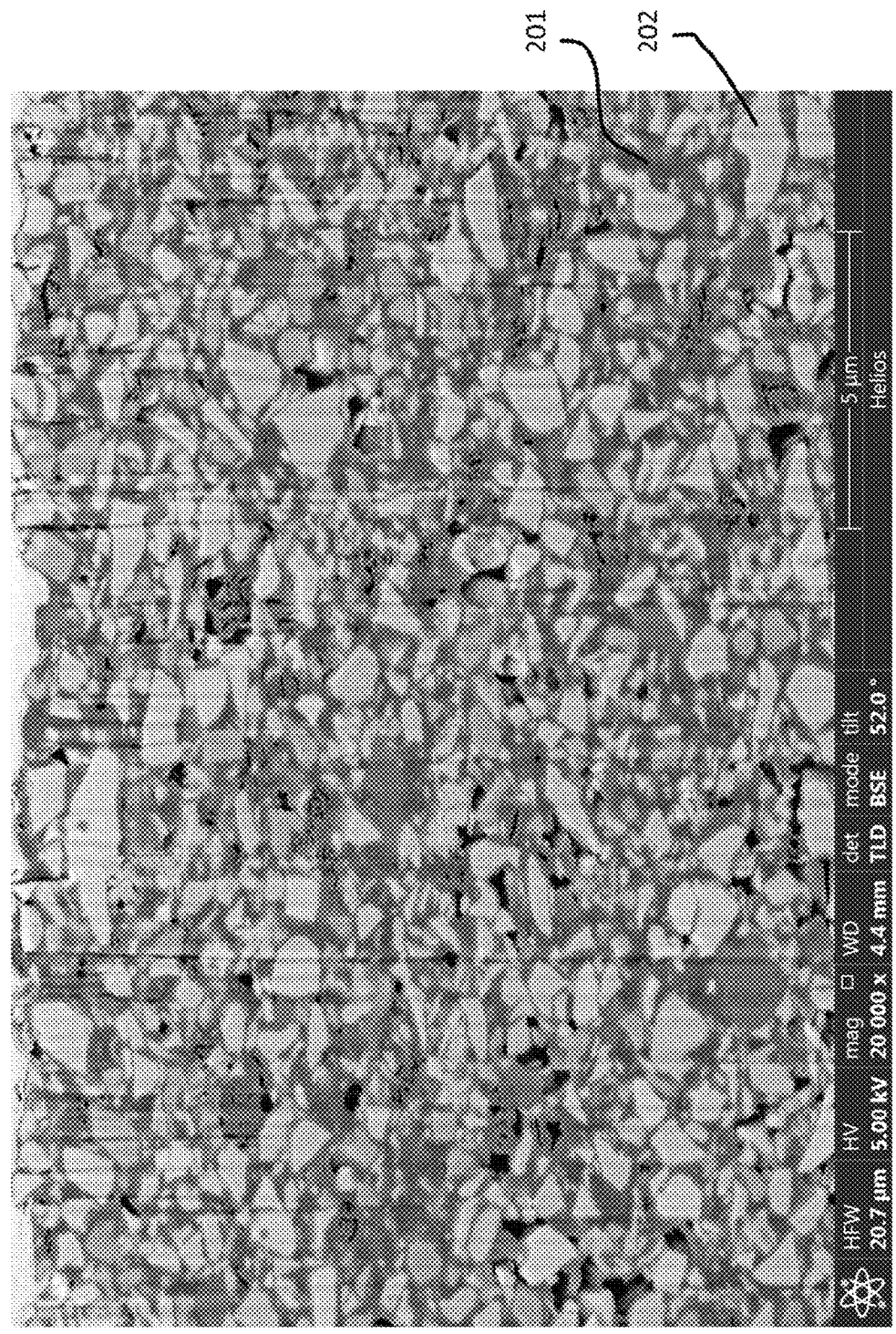

Green tape made in this example using slurry composition 1 was analyzed by SEM microscopy as set forth in FIG. 2.

Example 2

Method for Making and Sintering a Green Tape

In this example, the following slurries (Slurry 1, Slurry 2 and Slurry 3) were prepared having the following components at the recites weight percent (%). The source powder was $Li_{7.1}Zr_2La_3O_{12}+0.5Al_2O_3$, as batched. "Solids" below refers to the solid content of the Rhodoline 4160.

| Milled slurry | density (g/cm3) | Slurry 1 components by weight % | Slurry 2 components by weight % |
|---|---|---|---|
| IPA | 0.7825 | 12.20% | 10.72% |
| Butanol | 0.81 | 3.05% | 2.68% |
| THF | 0.889 | 14.63% | 12.87% |
| Rhodoline 4160 | 1.03 | 9.15% | 6.70% |
| water | 1 | 6.86% | 5.03% |
| solids | 1.132 | 2.29% | 1.68% |
| Garnet Powder | 5.1 | 60.98% | 67.02% |

| Milled slurry | density (g/cm3) | Slurry 3 components by weight % |
|---|---|---|
| Garnet | 4.75 | 66.40% |
| MEK | 0.805 | 13.48% |
| Ethanol | 0.789 | 13.48% |
| Rhodline 4160 | 1.1 | 6.64% |

In this example, the following binder mixtures were prepared having the following components at the recites weight percent (%):

| Binder mixture | density (g/cm3) | Binder mixture 1 by weight % | Binder mixture 2 by weight % |
|---|---|---|---|
| Di butyl phthalate | 1.05 | 14.49% | 14.49% |
| Butvar B 79 PVB | 1.08 | 14.49% | 14.49% |
| IPA | 0.7825 | 28.99% | 18.55% |
| Butanol | 0.81 | 7.25% | 4.64% |
| THF | 0.889 | 34.78% | 22.26% |

| | density (g/cm3) | Binder mixture 3 by weight % |
|---|---|---|
| MEK | 0.805 | 31.55% |
| Ethanol | 0.7781 | 31.55% |
| B76 | 1.083 | 22.29% |
| SANTICIZER 160 | 1.12 | 14.62% |

Slurry 1 was combined with binder mixture 1 in a 2.4 weight ratio to form a mixed slurry. Slurry 2 was combined with binder mixture 2 in a 2.1 weight ratio to form a mixed slurry. Slurry 3 was combined with binder mixture 3 in a 2. weight ratio to form a mixed slurry.

In this example, a green tape was prepared by casting each mixed slurry onto a substrate by doctor blading, subsequently sintering the cast slurry by placing it between two porous garnet setter plates, and then removed from the setter plates. In one example, the tape cast from the slurry was sintered at 1100° C. for 1-5 hours. In another example, the tape was sintered at 1125° C. for 1-5 hours. In another example, the tape was sintered at 1150° C. for 1-5 hours. Prior to the sintering, the binder was burned out in high pressure $O_2$ ($PO_2$) and $H_2O$. During sintering the atmosphere around the sintering film had a $PO_2$ in the range $0.5$-$10^{-20}$ atm.

Figure 4:
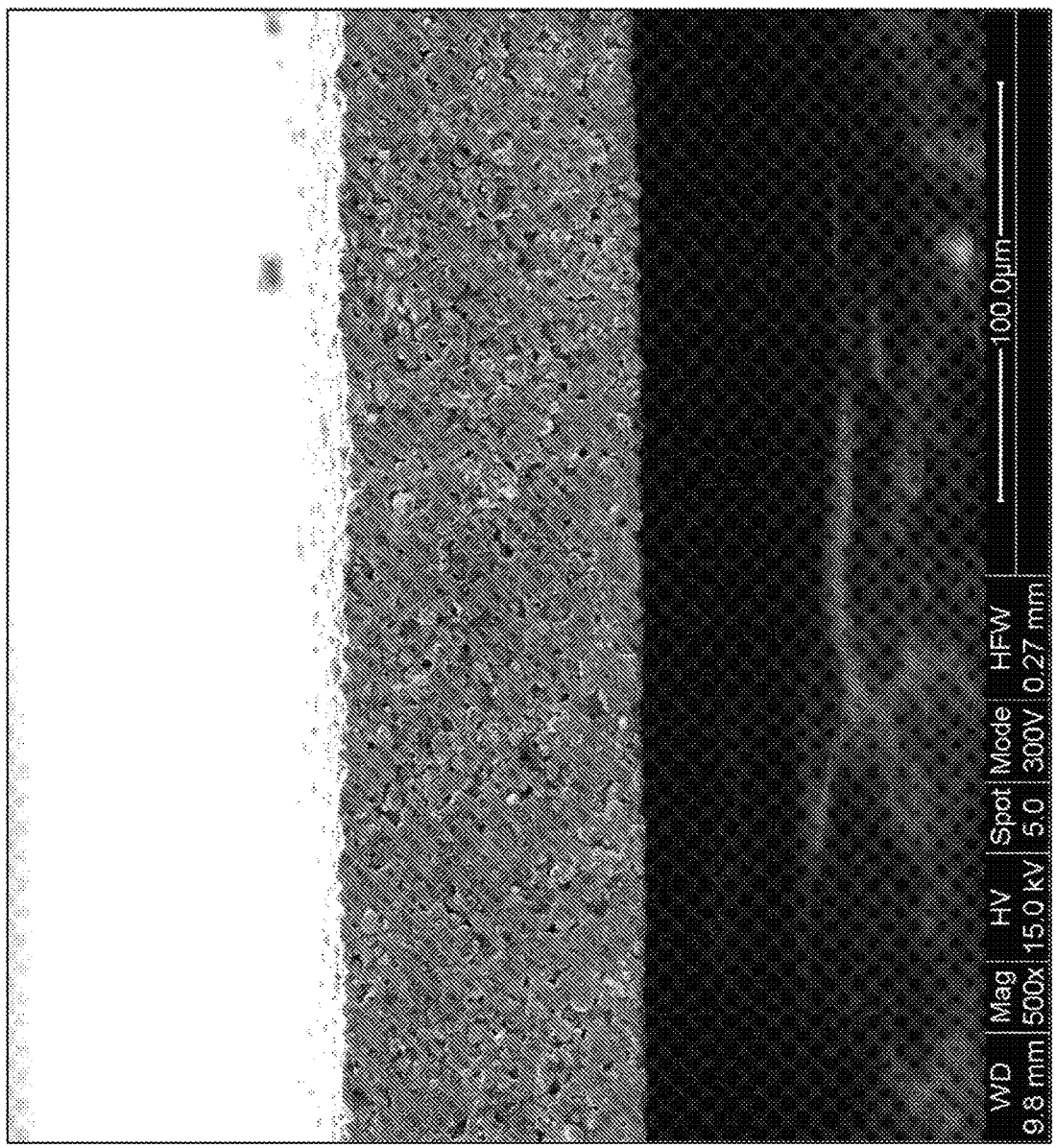
FIG. 4 shows a scanning electron microscopy (SEM) image of a sintered tape made by Example 2 with slurry composition 1 and binder composition 1.

Sintered films made in this example using slurry composition 1 and binder mixture 1 were analyzed by SEM microscopy as set forth in FIG. 4.

Example 3

Method for Layering and Sintering a Green Tape

In this example, the slurries and binder mixtures were prepared and combined as in Example 2. Next, a green tape was prepared by casting each mixed slurry onto a substrate by doctor blading. The cast mixed slurry was allowed to dry in air to form a green tape. Next, a second layer of a green tape was deposited onto the dried green tape. This process was repeated until there were five layers of green tape stacked on top of each other. Then the stacked green tapes were sintered by placing them between two porous garnet setter plates, and then removed from the setter plates. The stacked green tapes were sintered, in one example, at 1100° C. for 1-5 hours. In another example, the tape was sintered at 1125° C. for 1-5 hours. In another example, the tape was sintered at 1150° C. for 1-5 hours. Prior to the sintering, the binder was burned out in high pressure $O_2$ ($PO_2$) and $H_2O$. During sintering the atmosphere around the sintering film had a $PO_2$ in the range $0.5$-$10^{-20}$ atm.

Figure 3:
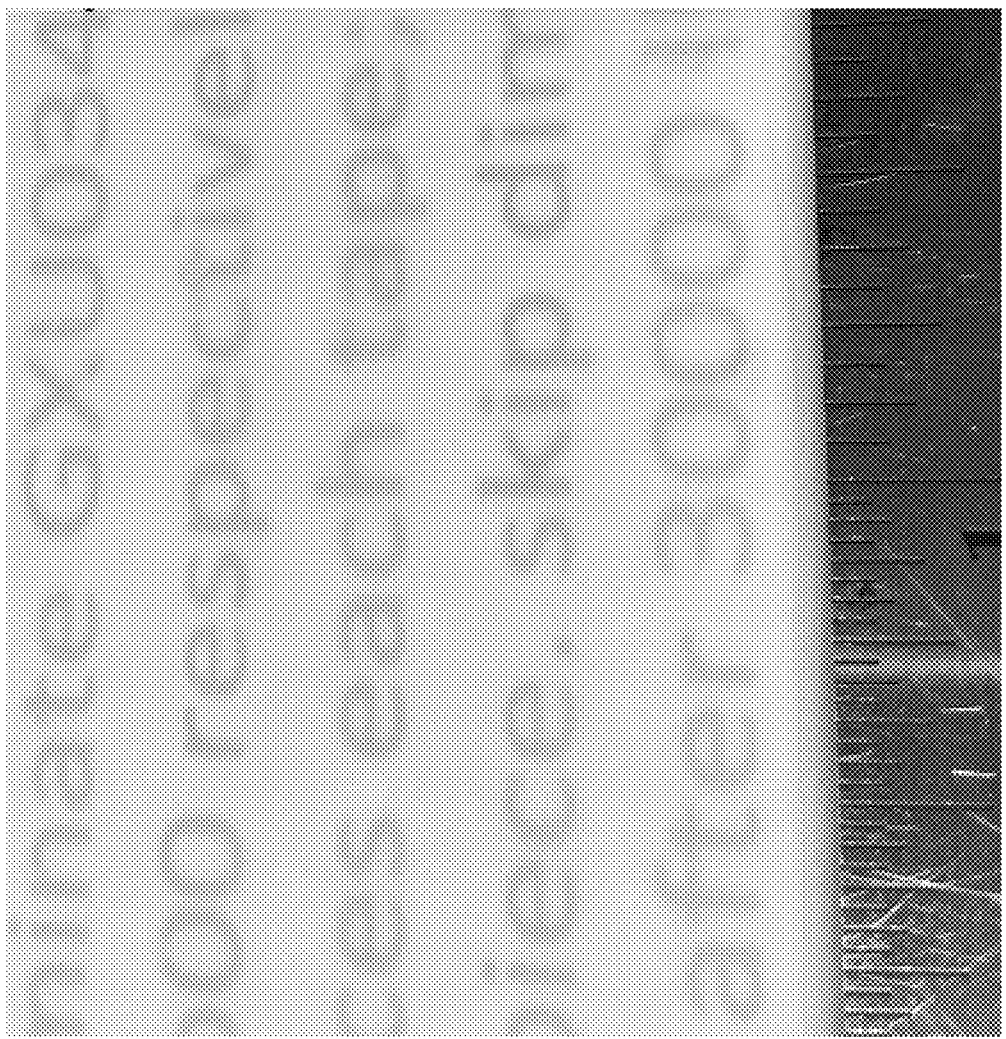
FIG. 3 shows an optical image of a 100-200 μm sintered green tape, prepared by Example 3.

Sintered films made using the aforementioned green tapes in this example were analyzed by optical imaging as set forth in FIG. 3.

The foregoing description of the embodiments of the disclosure has been presented for the purpose of illustration; it is not intended to be exhaustive or to limit the claims to the precise forms disclosed. Persons skilled in the relevant art can appreciate that using no more than routine experimentation, numerous equivalents, modifications and variations are possible in light of the above disclosure.

What is claimed is:

1. A method for sintering a green tape, the method comprising:
    (a) providing at least one source powder;
        wherein the at least one source powder is a lithium-stuffed garnet powder;
    (b) modifying the at least one source powder to prepare a modified source powder using an aprotic solvent;
    (c) providing a slurry of the modified source powder;
    (d) casting the slurry to form a green tape;
        wherein the green tape comprises the modified source powder, an aprotic solvent, a binder, and a dispersant;
        and
        wherein the amount of source powder in the green tape is at least 75%, 80%, 85%, or 90% by weight; and
        wherein modified source powder has a particle size distribution having a $d_{50}$ of 50 nm to 5 μm;
    (e) drying the green tape;
    (f) stress relieving the green tape; and
    (g) sintering the green tape.

2. The method of claim 1, wherein the amount of source powder in the green tape is at least 85% by weight.

3. The method of claim 1, wherein the at least one source powder is $Li_xZr_2La_3O_{12}yAl_2O_3$; wherein x ranges from 5 to 9; and y ranges from 0 to 1.

4. The method of claim 1, wherein the modifying the at least one source powder comprises modifying the particle size distribution of the at least one source powder.

5. The method of claim 4, wherein the particle size distribution, after the modifying step, has a $d_{50}$ of about 100 nm, 200 nm, 300 nm, 400 nm, 1 μm, 2 μm, 3 μm, or 4 μm.

6. The method of claim 1, wherein the surface area of the at least one source powder is increased to at least 5 $m^2/g$ during the modifying the at least one source powder.

7. The method of claim 6, wherein the surface area of the at least one source powder is increased to at least 8 $m^2/g$ and less than 15 $m^2/g$ during the modifying the at least one source powder.

8. The method of claim 1, wherein the modifying the at least one source powder comprises decreasing an average particle size of particles of the at least one source powder.

9. The method of claim 1, further comprising laminating more than one green tape together.

10. The method of claim 1, further comprising laminating one green tape on to a second green tape.

11. The method of claim 1, wherein the at least one source powder is a Li-stuffed garnet compound characterized by the formula $Li_xLa_yZr_zO_t \cdot qAl_2O_3$, wherein $4<x<10$, $1<y<4$, $1<z<3$, $6<t<14$, and $0 \leq q \leq 1$.

12. The method of claim 1, wherein the at least one source powder is a Li-stuffed garnet compound characterized by the formula $Li_{7-x}La_3Zr_2O_{12} \cdot qAl_2O_3$, wherein q is 0, 0.3, 0.35, 0.5, 0.75, or 1.0 and $0 \leq x \leq 1$.

13. The method of claim 1, wherein providing the slurry comprises formulating the slurry by mixing at least two or more of:
    a solvent selected from the group consisting of methanol, MEK, ethanol, propanol, isopropanol (IPA), acetone, cyclohexanol, toluene, acetic acid, benzene, and a combination thereof;
    a binder selected from the group consisting of fish oil, PVB, KD1, an acrylic acid, triton, phosphate esters, derivatives thereof, and combinations thereof;
    a plasticizer selected from the group consisting of a benzyl butyl phthalate and di-butyl phthalate;
    a pH modifier;
    a sintering aid; and
    a source powder selected from a lithium-stuffed garnet.

14. The method of claim 1, wherein the modifying comprises classifying the at least one source powder based on a particle size.

15. The method of claim 1, wherein the slurry, when dried, has about 80% w/w source powder.

16. The method of claim 1, wherein the slurry, when dried, has about 10-25% w/w organic content, wherein the organic content refers to slurry components other than the source powder.

17. The method of claim 1, wherein the slurry, when dried, has about 10-25% w/w organic content, wherein the organic content refers to slurry components other than the source powder wherein the source powder is a lithium-stuffed garnet.

18. The method of claim 1, wherein the amount of binder and plasticizer in the slurry is about 10-25% w/w organic content, wherein the organic content refers to slurry components other than the source powder wherein the source powder is a lithium-stuffed garnet.

19. The method of claim 1, wherein the source powder is characterized by the formula $Li_{7.1}Zr_2La_3O_{12}+0.5Al_2O_3$, as batched.

20. A green tape, comprising:
a source powder, wherein the source powder is a lithium-stuffed garnet powder;
an aprotic solvent;
a binder;
a pH modifier selected from citric acid or ammonia hydroxide; and
a dispersant;
wherein the amount of source powder in the green tape is at least 75%, 80%, 85%, or 90% by weight; and
wherein the modified source powder has a particle size distribution having a $d_{50}$ of 50 nm to 5 µm.

21. The green tape of claim 20, further comprising a member selected from a plasticizer, and a sintering aid.

22. The green tape of claim 20, comprising a sintering aid selected from MgO, $Al_2O_3$, and combinations thereof.

23. The green tape of claim 20, wherein the solvent is an azeotrope.

24. The green tape of claim 20, wherein the solvent further comprises a member selected from methyl ethyl ketone (MEK), tetrahydrofuran, toluene, acetone, 1-butanol, 2-butanol, cyclohexane, cyclohexanol, ethanol, isopropanol, methanol, 1-propanol, propylene carbonate, hexane, m-xylene, pentane, and combinations thereof.

25. The green tape of claim 24, wherein the solvent comprises methyl-ethyl ketone (MEK).

26. The green tape of claim 25, wherein the solvent further comprises isopropanol (IPA).

27. The green tape of claim 20, wherein the solvent further comprises cyclohexanone.

28. The green tape of claim 27, wherein the amount of cyclohexanone is about 10-25% by weight.

29. The green tape of claim 26, wherein the ratio of MEK:IPA is 8:2, 7:3, 6:4, 5:5, 4:6, 3:7, or 2:8 w/w.

30. The green tape of claim 20, comprising a source powder of a lithium-stuffed garnet having a density of 4 $g/cm^3$, and a solvent further comprising MEK and IPA.

31. The green tape of claim 20, comprising a source powder of a lithium-stuffed garnet having a density of 4 $g/cm^3$, and a solvent further comprising MEK, IPA, and cyclohexanone.

* * * * *